US009388271B2

(12) United States Patent
Nakaminami et al.

(10) Patent No.: US 9,388,271 B2
(45) Date of Patent: Jul. 12, 2016

(54) POLYOXYALKYLENE POLYOL OR MONOOL AND POLYURETHANE RESIN

(75) Inventors: Hiromichi Nakaminami, Kyoto (JP); Shogo Sugahara, Kyoto (JP); Shu Yasuhara, Kyoto (JP); Kouichi Murata, Kyoto (JP)

(73) Assignee: SANYO CHEMICAL INDUSTRIES, LTD., Kyoto (JP)

( * ) Notice: Subject to any disclaimer, the term of this patent is extended or adjusted under 35 U.S.C. 154(b) by 63 days.

(21) Appl. No.: 13/259,367

(22) PCT Filed: Mar. 24, 2010

(86) PCT No.: PCT/JP2010/002065
§ 371 (c)(1),
(2), (4) Date: Sep. 23, 2011

(87) PCT Pub. No.: WO2010/116634
PCT Pub. Date: Oct. 14, 2010

(65) Prior Publication Data
US 2012/0016049 A1    Jan. 19, 2012

(30) Foreign Application Priority Data

Mar. 30, 2009  (JP) ................. 2009-080808
Dec. 25, 2009  (JP) ................. 2009-294484

(51) Int. Cl.
| | |
|---|---|
| C08G 18/48 | (2006.01) |
| C08G 18/50 | (2006.01) |
| C08G 18/08 | (2006.01) |
| C08G 18/28 | (2006.01) |
| C08G 65/26 | (2006.01) |
| C08G 18/40 | (2006.01) |
| C08G 18/66 | (2006.01) |
| C08G 101/00 | (2006.01) |

(52) U.S. Cl.
CPC ............ *C08G 18/4845* (2013.01); *C08G 18/14* (2013.01); *C08G 18/283* (2013.01); *C08G 18/4072* (2013.01); *C08G 18/485* (2013.01); *C08G 18/4825* (2013.01); *C08G 18/4829* (2013.01); *C08G 18/4854* (2013.01); *C08G 18/4858* (2013.01); *C08G 18/4866* (2013.01); *C08G 18/4875* (2013.01); *C08G 18/4879* (2013.01); *C08G 18/5003* (2013.01); *C08G 18/6674* (2013.01); *C08G 18/6688* (2013.01); *C08G 65/2609* (2013.01); *C08G 65/2654* (2013.01); *C08G 65/2696* (2013.01); *C08G 2101/005* (2013.01); *C08G 2101/0008* (2013.01); *C08G 2101/0083* (2013.01)

(58) Field of Classification Search
CPC .......... C08G 65/2609; C08G 65/2654; C08G 65/2696; C08G 18/4845; C08G 18/4858; C08G 18/4854; C08G 18/485; C08G 18/14; C08G 18/283; C08G 18/4829; C08G 18/4825; C08G 18/4866; C08G 18/4875; C08G 18/4879; C08G 18/5003
USPC ......... 568/606, 607, 611, 613, 614, 616, 618, 568/620, 622, 624, 625, 621; 528/49, 76, 528/77, 79; 521/116, 174
See application file for complete search history.

(56) References Cited

U.S. PATENT DOCUMENTS

| | | | |
|---|---|---|---|
| 3,383,351 A | 5/1968 | Stamberger et al. | |
| 6,531,566 B1 | 3/2003 | Satake | |
| 6,815,467 B2 * | 11/2004 | Toyota et al. | 521/174 |
| 2003/0100623 A1 * | 5/2003 | Kaku et al. | 521/155 |

FOREIGN PATENT DOCUMENTS

| | | |
|---|---|---|
| EP | 0 403 313 A2 | 12/1990 |
| EP | 0 881 244 A2 | 12/1998 |
| JP | 39-025737 | 11/1964 |
| JP | 11-043529 A | 2/1999 |
| JP | 11-060678 A | 3/1999 |
| JP | 3076032 B1 | 8/2000 |
| JP | 2000-344881 A | 12/2000 |
| JP | 2001-261813 A | 9/2001 |
| JP | 2003-113219 A | 4/2003 |
| JP | 2003-113239 A | 4/2003 |
| JP | 3688667 B2 | 8/2005 |
| JP | 2007-131845 A | 5/2007 |
| JP | 2010-077417 A | 4/2010 |
| WO | 02/26864 A1 | 4/2002 |

OTHER PUBLICATIONS

International Search Report of PCT/JP2010/002065, mailing date Jun. 8, 2010, previously submitted.
Extended European Search Report of Application No. 10761342.4, dated Jul. 26, 2013. (7 pages).
Communication pursuant to Rule 114(2) EPC dated Mar. 19, 2015, issued in corresponding European Application No. 10761342.4. (7 pages).

\* cited by examiner

*Primary Examiner* — Rabon Sergent
(74) *Attorney, Agent, or Firm* — Westerman, Hattori, Daniels & Adrian, LLP

(57) ABSTRACT

There is provided a polyoxyalkylene polyol or monool (S) represented by formula (2). In the formula (2), $R^2$ represents an m-valent group in which m active hydrogens are removed from the active hydrogen-containing compound (H); Z is an alkylene group or a cycloalkylene group, and these groups are unsubstituted or substituted with a halogen atom or an aryl group. A hydroxyl value x, total degree of unsaturation y and the content of ethylene oxide z satisfy mathematical expression (3). In mathematical expression (3), x represents 5 to 280 mgKOH/g, y represents total degree of unsaturation represented by a unit meq/g, and z is from 0 to 50.

$$R^2\text{—}[\text{—}(ZO)p\text{-}(AO)q\text{-}(CH_2CH_2O)r\text{-H}] \quad (2)$$

$$y \leq 18.9 \times x^{-2} \times (100-z)/100 \quad (3)$$

8 Claims, 9 Drawing Sheets

Curve 1: Mathematical expression 1

Curve 2: Mathematical expression 3

Curve 3: Scope of the prior art (mathematical expression 4')

(described in Japanese Patent No. 3688667)

POLYOXYALKYLENE POLYOL OR MONOOL AND POLYURETHANE RESIN

TECHNICAL FIELD

The present invention relates to a polyoxyalkylene polyol or monool, and a polyurethane resin using the same.

BACKGROUND ART

Usually, a polyoxyalkylene polyol or monool is obtained by using an alkali metal such as potassium hydroxide as a catalyst, and performing addition polymerization of an active hydrogen-containing compound with an alkylene oxide such as propylene oxide or ethylene oxide. In the addition polymerization of PO using an alkali metal catalyst, a low molecular weight monool as a by-product is formed by transfer of PO to allyl alcohol. This low molecular weight monool as a by-product has a problem that it causes a decrease in the number of functional groups of the polyoxyalkylene polyol and a urethane resin using such a polyol causes deterioration of mechanical properties. Therefore, there is known a method of using cesium hydroxide or double metal cyanide as a catalyst in order to decrease the amount of such a low molecular weight monool as a by-product to be formed (see, for example, Patent Documents 1 and 2).

On the other hand, in a polyoxyalkylene polyol obtained by addition polymerization of AO having 3 or more carbon atoms in the presence of the above-mentioned catalyst, a primary hydroxylation ratio of a terminal hydroxyl group is drastically low (for example, usually 2% or less when potassium hydroxide is used) and most terminal hydroxyl groups are secondary hydroxyl groups. Therefore, this polyol has insufficient reactivity as a polyol component of a thermosetting resin. For example, this polyol has low reactivity with an isocyanate group of an isocyanate group-containing compound (tolylene diisocyanate, etc.) and has insufficient reactivity as a polyol component of a urethane resin.

It is necessary to have a primary hydroxyl group as a terminal hydroxyl group so as to ensure sufficient reactivity with an isocyanate group. For this purpose, there is known a method in which a terminal hydroxyl group is converted into a primary hydroxyl group by further performing addition polymerization of a polyoxyalkylene polyol obtained by addition polymerization of AO having 3 or more carbon atoms with EO. However, since a polyethylene oxide moiety is hydrophilic, this method has a problem that hydrophobicity of the polyoxyalkylene polyol deteriorates and, when such a polyol is used, physical properties and the like of the urethane resin are largely changed by humidity. Therefore, there is known a method in which the amount of a primary hydroxyl group in a terminal hydroxyl group is increased by using a specific catalyst (see, for example, Patent Document 3).

It is also known to be possible to obtain a polyoxyalkylene polyol, in which reactivity with an isocyanate group is improved while decreasing the amount of a low molecular weight monool as a by-product to be formed, by performing addition polymerization of AO using a cesium hydroxide or double-metal cyanide catalyst, first, and then carrying out addition polymerization of AO using a specific catalyst (see, for example, Patent Document 4).

PRIOR ART DOCUMENTS

Patent Documents

Patent Document 1: Japanese Patent Application Laid-Open (JP-A) No. 2007-131845

Patent Document 2: JP-A No. 2007-131845
Patent Document 3: Japanese Patent No. 3076032
Patent Document 4: Japanese Patent No. 3688667

SUMMARY OF THE INVENTION

Problems to be Solved by the Invention

However, it is hardly to say that a urethane elastomer and a urethane foam using the above-mentioned polyoxyalkylene polyol have sufficient mechanical properties and moisture resistance.

An object to be achieved by the present invention is to provide a polyoxyalkylene polyol and a polyoxyalkylene monool, capable of producing a urethane elastomer and a urethane foam which are sufficiently excellent in mechanical properties and moisture resistance.

Means for Solving the Problems

The present inventors have intensively studied so as to solve the above problems, and thus have reached inventions shown in the following (I) and (II).

That is, the present invention include inventions shown in the following (I) and (II).

(I) The gist of the polyoxyalkylene polyol or monool (S) of the present invention lies in that it is an alkylene oxide adduct of an active hydrogen-containing compound (H), wherein 40% or more of hydroxyl groups located at the terminal are primary hydroxyl group-containing groups represented by the general formula (1) shown below, and a hydroxyl value x, the total degree of unsaturation y and the content of ethylene oxide z satisfy a relationship of the mathematical expression (1).

[Chemical Formula 1]

[In the general formula (1), $R^1$ represents a hydrogen atom, or an alkyl group having 1 to 12 carbon atoms, a cycloalkyl group or a phenyl group, each of which may be substituted with a halogen atom or an aryl group.]

$$y \leq 28.3 \times x^{-2} \times (100-z)/100 \tag{1}$$

[In the mathematical expression (1), x represents a hydroxyl value represented by a unit mgKOH/g, y represents the total degree of unsaturation represented by a unit meq/g, and z is the content of ethylene oxide based on the weight of (S) and is from 0 to 50% by weight.]

(II) The gist of the foamed or non-foamed polyurethane resin of the present invention lies in that it is a foamed or non-foamed polyurethane resin obtained by reacting a polyol component with an organic polyisocyanate component (V), wherein the above-mentioned (I) polyoxyalkylene polyol or monool (S) is used as at least a part of the polyol component.

Effects of the Invention

The polyoxyalkylene polyol or monool (S) of the present invention enables formation of a urethane resin having satisfactory mechanical properties and moisture resistance since the amount of a low molecular weight monool as a by-product is decreased and also it has sufficient reactivity as a raw material for the production of a polyurethane resin.

Also, the foamed or non-foamed polyurethane resin of the present invention has satisfactory mechanical properties and moisture resistance.

MODE FOR CARRYING OUT THE INVENTION

Figure 1:
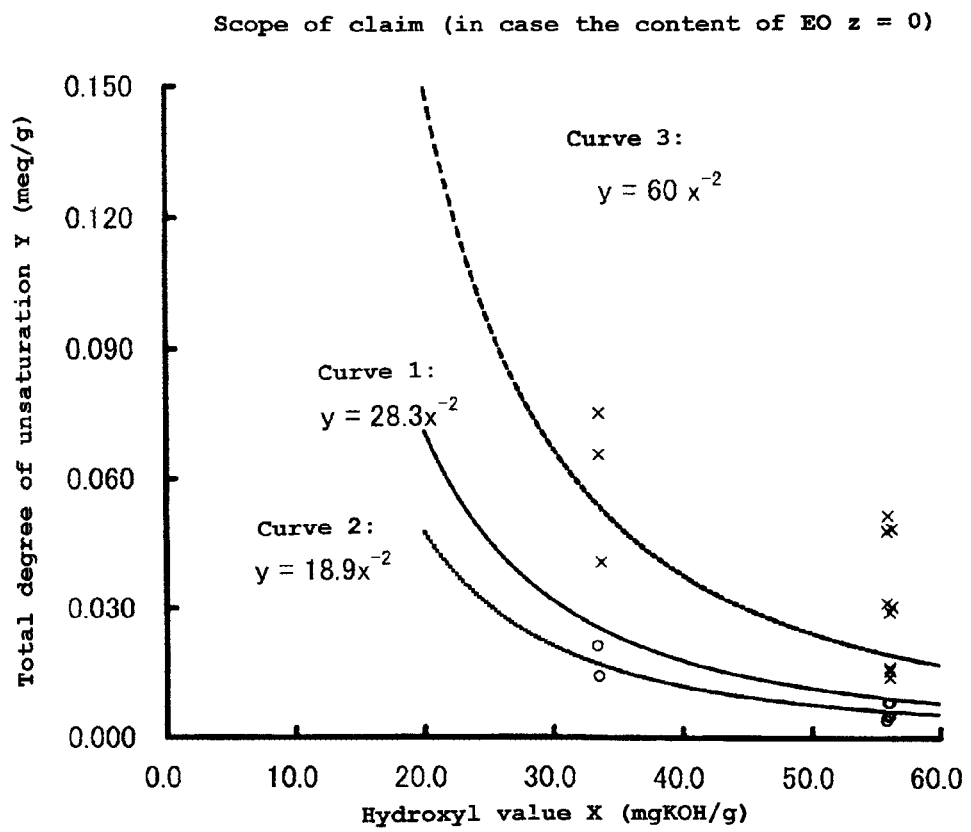
FIG. 1 is a graph showing a relationship between the hydroxyl value x and the total degree of unsaturation y of a polyoxyalkylene polyol or monool (S).

The present invention provides a polyoxyalkylene polyol or monool (S), which is an alkylene oxide adduct of an active hydrogen-containing compound (H), wherein 40% or more of hydroxyl groups located at the terminal are primary hydroxyl group-containing groups represented by the general formula (1) shown below, and a hydroxyl value x, the total degree of unsaturation y and the content of ethylene oxide z satisfy a relationship of the mathematical expression (1) shown below.

[Chemical Formula 2]

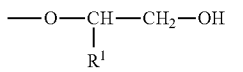

$$\mathrm{—O—CH—CH_2—OH} \atop \mathrm{R^1} \qquad (1)$$

$$y \leq 28.3 \times x^{-2} \times (100-z)/100 \qquad (1)$$

In the above-mentioned mathematical expression (1), x is preferably within a range from 5 to 280 mgKOH/g, more preferably from 10 to 115 mgKOH/g, and particularly preferably from 25 to 75 mgKOH/g. When x is 5 mgKOH/g or more, it is easy handling since the polyoxyalkylene polyol or monool has low viscosity. When x is 280 mgKOH/g or less, the synthesized urethane resin has satisfactory elongation physical properties. x is determined by JISK-1557.

y is the total degree of unsaturation (meq/g) of the polyoxyalkylene polyol or monool and is determined by JISK-1557. y is preferably from 0 to 0.04 or less, more preferably from 0 to 0.03 or less, and particularly preferably from 0 to 0.02 or less, from the viewpoint of physical properties of the urethane resin.

z is the content of ethylene oxide (% by weight) based on the weight of the polyoxyalkylene polyol or monool. z is within a range from 0 to 50, preferably from 0 to 25, and particularly preferably from 0 to 20. When z is more than 50, moisture resistance of the obtained polyurethane resin becomes worse. z is determined by $^1$H-NMR measurement under usual conditions.

The mathematical expression (1) can also be represented by using a hydroxyl group equivalent w in place of the hydroxyl value x. In that case, the hydroxyl group equivalent w, the total degree of unsaturation y and the content of ethylene oxide z satisfy a relationship of mathematical equation (2). The hydroxyl group equivalent (w) is obtained by the calculation expression of w=56100/x.

$$y \leq (9.0 \times 10^{-9}) w^2 \times (100-z)/100 \qquad (2)$$

As described above, the relationship among the hydroxyl value x, the total degree of unsaturation y and the content of ethylene oxide z of the polyoxyalkylene polyol or monool (S) of the present invention satisfies the relationship of the mathematical expression (1).

$$y \leq 28.3 \times x^{-2} \times (100-z)/100 \qquad (1)$$

The polyoxyalkylene polyol or monool (S) of the present invention has a feature that it has sufficient reactivity with isocyanate and hydrophobicity. The urethane resin obtained by using this (S) has high reactivity upon production, and mechanical properties (hardness, elongation at break, tensile strength, tear strength) and moisture resistance of the resin become satisfactory.

More preferably, (S) of the present invention satisfies a relationship of the mathematical expression (3).

$$y \leq 18.9 \times x^{-2} \times (100-z)/100 \qquad (3)$$

The polyoxyalkylene polyol or monool (S) satisfying the mathematical expression (3) exhibits a decrease in the amount of an unsaturated monool as compared with the case of satisfying the mathematical expression (1), and mechanical properties of the polyurethane resin or urethane foam produced by using such a polyoxyalkylene polyol are further improved.

The right-hand side is the value calculated from the hydroxyl value x and the content of ethylene oxide z. The right-hand side decreases as the hydroxyl value x becomes larger. That is, it decreases as a molecular weight per hydroxyl group of (S) becomes smaller. The right-hand side decreases as the content of ethylene oxide z becomes larger.

The left-hand side of the above-mentioned expressions (1) and (3) is the total degree of unsaturation y.

Incidentally, since the unsaturated group of the conventional polyoxyalkylene polyol or monool is formed by the transfer reaction of alkylene oxide other than ethylene oxide (particularly propylene oxide) during this production process, it is known that the unsaturation degree y tends to increase as the content of ethylene oxide in the polyoxyalkylene polyol becomes smaller, whereas, the unsaturation degree y tends to increase as the molecular weight becomes larger. Therefore, it tends to be difficult for the polyoxyalkylene polyol or monool having a small content of ethylene oxide or a large molecular weight to satisfy the expressions (1) and (3).

That is, the expression (1) or (3) shows a range where the total degree of unsaturation y is small as compared with the hydroxyl value x and the content of ethylene oxide z. The above-mentioned expressions (1) and (3) shows a range where the effects which has been experimentally found of the present invention are obtained.

The total degree of unsaturation y exponentially becomes higher as the molecular chain length per OH group becomes longer, that is, as the hydroxyl value (x) becomes smaller.

This is because the reaction rate of rearrangement of AO to an unsaturated compound is constant upon the addition reaction of AO and the addition reaction rate decreases as the concentration of OH groups in the system becomes lower. Coefficients (28.3 and 18.9) attached to $x^{-2}$ of the mathematical expressions (1) and (3) were determined from this theoretical analysis and curve fitting to experimental data. FIG. 1 shows the case where the content of EO z=0 and since EO does not undergo the rearrangement reaction, (100−z)/100 was added to the molecular chain length of the moiety in which EO is removed from hydroxyl groups as a correction term to establish the mathematical expression (1).

The polyoxyalkylene polyol or monool (S) of the present invention is an alkylene oxide adduct of an active hydrogen-containing compound (H).

Examples of the active hydrogen compound (H) include a hydroxyl group-containing compound, an amino group-containing compound, a carboxyl group-containing compound, a thiol group-containing compound, a phosphoric acid compound; a compound having two or more kinds of active hydrogen-containing functional groups in the molecule; and two or more kinds of mixtures thereof.

Examples of the hydroxyl group-containing compound include water, monohydric alcohol, di- to octa-hydric polyhydric alcohol, phenol, polyhydric phenol and the like. Specific examples thereof include monohydric alcohols such as methanol, ethanol, butanol and octanol; dihydric alcohols such as ethylene glycol, propylene glycol, 1,4-butanediol, 1,6-hexanediol, diethylene glycol, neopentyl glycol, 1,4-bis(hydroxymethyl)cyclohexane and 1,4-bis(hydroxyethyl)benzene; trihydric alcohols such as glycerin and trimethylolpropane; tetra- to octa-hydric alcohols, such as pentaerythritol, sorbitol and sucrose; phenols such as phenol and cresol; polyhydric phenols such as pyrogallol, catechol and hydroquinone; bisphenols such as bisphenol A, bisphenol F and bisphenol S; polybutadiene polyol; castor oil-based polyol; polyfunctional (for example, number of functional group of 2 to 100) polyols such as (co)polymer of hydroxyalkyl (meth)acrylate and polyvinyl alcohol; and the like.

The (meth)acrylate means a methacrylate and/or an acrylate, and the same shall apply hereinafter.

Examples of the amino group-containing compound include amine, polyamine, aminoalcohol and the like. Specific examples thereof include ammonia; monoamines such as alkylamine having 1 to 20 carbon atoms (butylamine, etc.) and aniline; aliphatic polyamines such as ethylenediamine, hexamethylenediamine and diethylenetriamine; heterocyclic polyamines such as piperazine and N-aminoethylpiperazine; alicyclic polyamines such as dicyclohexylmethanediamine and isophoronediamine; aromatic polyamines such as phenylenediamine, tolylene diamine and diphenylmethanediamine; alkanolamines such as monoethanolamine, diethanolamine and triethanolamine; polyamidepolyamines obtained by condensation of dicarboxylic acid and excess polyamine; polyetherpolyamine; hydrazines (hydrazine and monoalkylhydrazine, etc.), dihydrazides (succinic acid dihydrazide and terephthalic acid dihydrazide, etc.), guanidines (butylguanidine and 1-cyanoguanidine, etc.); dicyandiamide; and two or more kinds of mixtures thereof.

Examples of the carboxyl group-containing compound include aliphatic monocarboxylic acids such as acetic acid and propionic acid; aromatic monocarboxylic acids such as benzoic acid; aliphatic polycarboxylic acids such as succinic acid and adipic acid; aromatic polycarboxylic acids such as phthalic acid and trimellitic acid; polycarboxylic acid polymers (number of functional group of 2 to 100) such as a (co)polymer of acrylic acid; and the like.

The thiol group-containing compound includes a polythiol compound and examples thereof include di- to octa-hydric polyhydric thiols. Specific examples thereof include ethylenedithiol, 1,6-hexanedithiol and the like.

Examples of the phosphoric acid compound include phosphoric acid, phosphorous acid, phosphonic acid and the like.

Among these active hydrogen-containing compounds (H), a hydroxyl group-containing compound and an amino group-containing compound are preferred, and water, a monohydric alcohol, a polyhydric alcohol and an amine are particularly preferred, from the viewpoint of reactivity.

Examples of the alkylene oxide (hereinafter abbreviated as AO) to be added to the active hydrogen-containing compound (H) include AO having 2 to 6 carbon atoms, for example, ethylene oxide (hereinafter abbreviated as EO), 1,2-propylene oxide (hereinafter abbreviated as PO), 1,3-propylene oxide, 1,2-butylene oxide, 1,4-butylene oxide and the like. Among these alkylene oxides, PO, EO and 1,2-butylene oxide are preferred from the viewpoint of properties and reactivity. When two or more kinds of AO(s) (for example, PO and EO) are used, the addition method may be either a block addition method or a random addition method, or these methods may be used in combination.

An alkylene oxide adduct of the active hydrogen-containing compound (H) includes a polyoxyalkylene polyol or monool represented by the general formula (2) shown below.

[Chemical Formula 3]

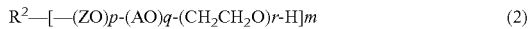

$$R^2-[-(ZO)p\text{-}(AO)q\text{-}(CH_2CH_2O)r\text{-}H]m \quad (2)$$

In the general formula (2), $R^2$ is an m-valent group in which m active hydrogens are removed from the active hydrogen-containing compound (H), m is the number of active hydrogen included in (H) and is an integer of 1 (monool) or 2 to 100 (polyol).

m is preferably 50 or less, and more preferably 10 or less, from the viewpoint of properties of (S) such as viscosity.

In the above-mentioned general formula (2), Z represents an alkylene group having 2 to 12 carbon atoms or a cycloalkylene group, each of which may be substituted with a halogen atom or an aryl group, represented by the general formula (3) or (4) shown below.

[Chemical Formula 4]

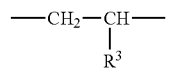

(3)

[Chemical Formula 5]

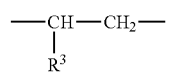

(4)

In the general formulas (3) and (4), $R^3$ represents a hydrogen atom, or an alkylene group having 1 to 10 carbon atoms, a cycloalkyl group or a phenyl group, each of which may be substituted with a halogen atom or an aryl group.

Specific examples of Z include an ethylene group, a propylene group, a butylene group, a chloropropylene group, a phenylethylene group, a 1,2-cyclohexylene group and the like, and use of two or more kinds of these groups in combination. Among these groups, a propylene group, a butylene group and an ethylene group are preferred from the viewpoint of properties of (S) such as viscosity. When securement of hydrophobicity of the obtained polyoxyalkylene polyol or monool (S) is taken into consideration, a propylene group, a butylene group and the like may be used, or an ethylene group and the other alkylene group may be used in combination.

In the above-mentioned general formula (2), A is an alkylene group having 3 to 12 carbon atoms or a cycloalkylene group, each of which may be substituted with a halogen atom or an aryl group, represented by the general formula (5) or (6) shown below.

[Chemical Formula 6]

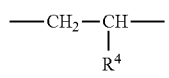  (5)

[Chemical Formula 7]

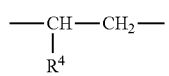  (6)

In the general formulas (5) and (6), $R^4$ represents an alkylene group having 1 to 10 carbon atoms, a cycloalkyl group or a phenyl group, each of which may be substituted with a halogen atom or an aryl group.

Specific examples of A include a propylene group, a butylene group, a chloropropylene group, a phenylethylene group, a 1,2-cyclohexylene group, and use of two or more kinds of them in combination. Among these groups, from the viewpoint of properties of (S) such as viscosity, a propylene group and a butylene group are preferred.

When a plurality of Zs or As are present, each may be the same or different.

In the general formula (2), p and r represent 0 or an integer of 1 to 200. q is an integer of 1 to 200. From the viewpoint of the viscosity of the polyoxyalkylene polyol or monool (S), p+q+r preferably represents an integer of 1 to 400, and more preferably an integer of 1 to 200.

Among those represented by the general formula (2), particularly those in which r is 0 mean that EO is not added to the terminal portion of the polyoxyalkylene polyol or monool (S).

Among those represented by the general formula (2), preferably 40% or more, more preferably from 60% or more, and still more preferably from 65% or more, of a structure A located at the terminal of the moiety of $(AO)_q$ in the general formula (2) is a structure represented by the general formula (6). When the proportion is within this range, it becomes easy to satisfy the relationship of the mathematical expression (1).

In the polyoxyalkylene polyol or monool (S) of the present invention, 40% or more of hydroxyl groups located at the terminal are primary hydroxyl group-containing groups represented by the above-mentioned general formula (1).

For example, when (S) is represented by the above-mentioned general formula (2), it is supposed that the hydroxyl group-containing group located at the terminal may include two kinds, for example, the primary hydroxyl group-containing group represented by the above-mentioned general formula (1) and a secondary hydroxyl group-containing group represented by the below-mentioned general formula (10) observed when r=0. In (S) of the present invention, 40% or more of hydroxyl groups located at the terminal are primary hydroxyl group-containing groups represented by the above-mentioned general formula (1) regardless of the value of r in the above general formula (2).

In (S), the ratio of the primary hydroxyl group-containing group represented by the above-mentioned general formula (1) (this is referred to as a primary hydroxyl group ratio in the present description, the same shall apply hereinafter) to all hydroxyl groups at the terminal is 40% or more based on the amount of all hydroxyl groups at the terminal of the polyoxyalkylene polyol or monool (S), and is preferably 60% or more, and more preferably 65% or More, from the viewpoint of the reactivity of (5). When the primary hydroxyl group ratio is less than 40%, the reactivity as a polyol component is insufficient.

[Chemical Formula 8]

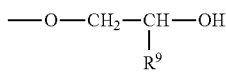  (10)

$R^1$ in the above-mentioned general formula (1) represents a hydrogen atom, or an alkyl group having 1 to 12 carbon atoms, a cycloalkyl group or a phenyl group, each of which may be substituted with a halogen atom or an aryl group, and $R^9$ in the general formula (10) represents an alkyl group having 1 to 12 carbon atoms, a cycloalkyl group or a phenyl group, each of which may be substituted with a halogen atom or an aryl group.

Specific examples of $R^1$ include a hydrogen atom; linear alkyl groups such as a methyl group, an ethyl group and a propyl group; branched alkyl groups such as an isopropyl group; substituted phenyl groups such as a phenyl group and a p-methylphenyl group; substituted alkyl groups such as a chloromethyl group, a bromomethyl group, a chloroethyl group and a bromoethyl group; substituted phenyl groups such as a p-chlorophenyl group and a p-bromophenyl group; cyclic alkyl groups such as a cyclohexyl group; and use of two or more kinds of them in combination. Specific examples of $R^{9-}$ include those other than a hydrogen atom among the groups exemplified as for $R^1$.

In the present invention, the primary hydroxyl group ratio is calculated by measuring using a $^1$H-NMR method after subjecting the sample to esterification pretreatment in advance.

A measuring method of the primary hydroxyl group ratio will be specifically described below.

<Method for Preparation of Sample>

After weighing about 30 mg of a measuring sample in a sample tube for NMR having a diameter of 5 mm, about 0.5 ml of a deuterated solvent is added to dissolve the sample. Thereafter, about 0.1 ml of trifluoroacetic anhydride is added to obtain a sample for analysis. Examples of the above-mentioned deuterated solvent include deuterated chloroform, deuterated toluene, deuterated dimethyl sulfoxide, deuterated dimethylformamide and the like, and a solvent capable of dissolving the sample is appropriately selected.

<NMR Measurement>

$^1$H-NMR measurement is performed under conventional conditions.

<Method for Calculation of Primary Hydroxyl Group Ratio>

By using the above-mentioned pretreatment method, the terminal hydroxyl group of the polyoxyalkylene polyol or monool reacts with trifluoroacetic anhydride added to form a trifluoroacetic acid ester. As a result, a signal derived from a methylene group, to which a primary hydroxyl group is bound, is observed at about 4.3 ppm, while a signal derived from a methine group, to which a secondary hydroxyl group is bound, is observed at about 5.2 ppm (deuterated chloroform is used as a solvent). The primary hydroxyl group ratio is calculated by the following calculation equation:

Primary hydroxyl group ratio (%)=$[a/(a+2 \times b)] \times 100$ where a denotes an integrated value of the signal derived from a methylene group, to which a primary hydroxyl group is bound, at about 4.3 ppm; and b denotes an integrated value of the signal derived from a methine group, to which a secondary hydroxyl group is bound, at about 5.2 ppm.

The number average molecular weight [measured by gel permeation chromatograph (GPC), the same shall apply to the following number average molecular weight unless otherwise specified] of the polyoxyalkylene polyol or monool (S) of the present invention is appropriately selected depending on required physical properties of applications of (S), for example, thermosetting resins such as a polyurethane resin to be produced, and there is no particular limitation thereon. From the viewpoint of physical properties of the polyurethane resin, it is preferably from 400 to 100,000, and more preferably from 400 to 20,000.

Specific examples of the polyoxyalkylene polyol or monool (S) include a PO adduct of water, a PO adduct of methanol, a PO adduct of glycerin, an EO/PO copolymerized adduct of water, a PO/butylene oxide copolymerized adduct of water, an EO/PO copolymerized adduct of methanol, a PO/butylene oxide copolymerized adduct of methanol, an EO/PO copolymerized adduct of glycerin, a copolymerized adduct of an EO/PO/butylene oxide of water, a copolymerized adduct of an EO/PO/butylene oxide of methanol, a copolymerized adduct of an EO/PO/butylene oxide of glycerin and the like.

An active hydrogen-containing compound (J) represented by the general formula (11) shown below can be produced by a conventionally known method and, for example, it can be produced by ring-opening addition polymerization of the active hydrogen-containing compound (H) with an alkylene oxide having 2 to 12 carbon atoms. There is no particular limitation on the catalyst of this polymerization.

The polyoxyalkylene polyol or monool (S) of the present invention can be obtained by converting into an active hydrogen compound (K) represented by the general formula (12) shown below by ring-opening addition polymerization of (J) with an alkylene oxide having 3 to 12 carbon atoms in the presence of a catalyst (C). Optionally, ring-opening addition polymerization of 0 to 30% by weight of EO to the terminal of (K) may be performed. A method of ring-opening addition polymerization of EO to (K) may be performed under conventionally known conditions, and there is no particular limitation on the catalyst. When addition polymerization of EO to the terminal of (K) is not performed, (K) may be (S), and the hydroxyl value x and total degree of unsaturation y of the obtained (S) may satisfy the relationship of the mathematical expression (1).

[Chemical Formula 9]

(11)

[Chemical Formula 10]

(12)

In the general formula (11), $R^2$, Z, p and m are the same as those in the general formula (2), and those described above can be exemplified.

In the general formula (12), $R^2$, Z, A, p, q and m are the same as those in the general formula (2), and those described above can be exemplified.

Specific examples of the active hydrogen-containing compound (J) include the same as those described above as for the active hydrogen-containing compound (H) when p is 0.

Examples thereof include compounds obtained by adding an alkylene oxide having 2 to 12 carbon atoms to those in which the aforementioned p is 0, that is, (H) when p is 1 or more. There is no particular limitation on the catalyst used upon this addition reaction.

Specific examples of (J) include adducts of EO, PO and butylene oxide and the like to (H). More specific examples thereof include an EO adduct of water, a PO adduct of water, an EO adduct of methanol, a PO adduct of methanol, an EO adduct of glycerin, a PO adduct of glycerin, an ethylene oxide adduct of ammonia, a propylene oxide adduct of ammonia, an EO/PO copolymerized adduct of water, a PO/butylene oxide copolymerized adduct of water, an EO/PO copolymerized adduct of methanol, an EO/butylene oxide copolymerized adduct of methanol, a PO/butylene oxide copolymerized adduct of methanol, an EO/PO copolymerized adduct of glycerin, an EO/butylene oxide copolymerized adduct of glycerin, a PO/butylene oxide copolymerized adduct of glycerin, an ethylene oxide/propylene oxide copolymerized adduct of ammonia, a copolymerized adduct of an EO/PO/butylene oxide of water, a copolymerized adduct of an EO/PO/butylene oxide of methanol, a copolymerized adduct of an EO/PO/butylene oxide of glycerin, a copolymerized adduct of an EO/PO/butylene oxide of ammonia and the like.

Examples of the active hydrogen-containing compound (K) include compounds obtained by addition polymerization of the above-mentioned active hydrogen-containing compound (J) with an alkylene oxide having 3 to 12 carbon atoms. Since it is easy to obtain the polyoxyalkylene polyol or monool (S) of the present invention, the catalyst used in this addition polymerization is preferably a catalyst (C).

Examples of (K) include adducts of PO, butylene oxide and the like to (J).

From the viewpoint of reactivity, the total content of zinc, iron, cobalt, chromium and manganese is preferably 2 ppm or less, and more preferably 1 ppm or less, in the polyoxyalkylene polyol or monool (S) in the present invention.

The catalyst (C) is a compound represented by the general formula (7-1), (7-2) or (7-3) shown below. A ring-opening polymer is obtained with a satisfactory yield and a polyoxyalkylene polyol having a terminal hydroxyl group with a high primary hydroxyl group ratio is obtained by performing ring-opening addition polymerization of an alkylene oxide having 3 to 12 carbon atoms using the catalyst.

[Chemical Formula 11]

(7-1)

[Chemical Formula 12]

(7-2)

[Chemical Formula 13]

(7-3)

In the above-mentioned general formula (7-1), (7-2) or (7-3), respectively, X represents a boron atom or an aluminum atom. From the viewpoint of reactivity, a boron atom is preferred.

In the general formula (7-1), (7-2) or (7-3), $R^5$ represents a (substituted) phenyl group represented by the general formula (8) shown below or a tertiary alkyl group represented by the general formula (9) shown below and, when a plurality of $R^5$s are present, the plurality of $R^5$s each may be the same or different.

[Chemical Formula 14]

(8)

[Chemical Formula 15]

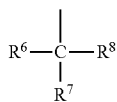
(9)

In the above-mentioned general formula (8), Y represents a hydrogen atom, an alkyl group having 1 to 4 carbon atoms, a halogen atom, a nitro group or a cyano group and may be the same or different. Among these, a hydrogen atom, a halogen atom and a cyano group are preferred, and a halogen atom and a cyano group are more preferred.

k represents the number of 0 to 5.

Specific examples of the phenyl group or substituted phenyl group represented by the general formula (8) include a phenyl group, a pentafluorophenyl group, a p-methylphenyl group, a p-cyanophenyl group, a p-nitrophenyl group and the like, and a phenyl group, a pentafluorophenyl group and a p-cyanophenyl group are preferred, and a phenyl group and a pentafluorophenyl group are more preferred.

In the above-mentioned general formula (9), $R^6$, $R^7$ or $R^8$ each independently represents an alkyl group having 1 to 4 carbon atoms and may be the same or different. Specific examples thereof include a methyl group, an ethyl group, a propyl group, an isopropyl group and the like. Specific examples of the tertiary alkyl group represented by the general formula (9) include a t-butyl group, a t-pentyl group and the like.

Specific examples of the catalyst (C) include triphenylborane, diphenyl-t-butylborane, tri(t-butyl) borane, triphenylaluminum, tris(pentafluorophenyl) borane, and tris(pentafluorophenyl) aluminum.

Among these catalysts, triphenylborane, tris(pentafluorophenyl) borane and tris(pentafluorophenyl) aluminum are preferred from the viewpoint of catalytic activity and selectivity.

The number of mol of an alkylene oxide to be added when the alkylene oxide is added to the active hydrogen-containing compound (J) in the presence of the catalyst (C) to obtain the active hydrogen compound (K) is preferably from 1 mol to 200 mol, and more preferably from 1 to 100 mol, based on the active hydrogen of the active hydrogen-containing compound (J), and is appropriately selected depending on the molecular weight of the ring-opening polymer to be produced and applications thereof.

There is no particular limitation on the amount of the catalyst (C) used, and it is preferably from 0.0001 to 10% by weight, and more preferably from 0.0005 to 1% by weight, based on the ring-opening polymer to be produced.

When the alkylene oxide is added to the active hydrogen-containing compound (J) in the presence of the catalyst (C) to obtain the active hydrogen compound (K) represented by the aforementioned general formula (12), it is preferred to continuously or intermittently remove a low boiling point compound (t) as a by-product having a boiling point of 150° C. or lower under a pressure of 0.1 MPa since it is easy to obtain (S) of the present invention, which satisfies the aforementioned mathematical expression (1). Removal may be carried out by any conventionally known method. Examples thereof include a method in which (t) is removed from the reaction mixture by heating and/or reducing the pressure; a method in which a vapor phase in a reaction vessel is extracted from the reaction vessel using a vapor phase circulation pump and (t) is removed by an adsorbent; a method in which a vapor phase in a reaction vessel is extracted from the reaction vessel using a vapor phase circulation pump and (t) is reacted using a catalyst, followed by separation as a high boiling point compound; a method in which a vapor phase in a reaction vessel is extracted from the reaction vessel using a vapor phase circulation pump and (t) is separated by distillation; and the like.

Specific examples of the low boiling point compound (t) as a by-product having a boiling point of 150° C. or lower under a pressure of 0.1 MPa include formaldehyde (boiling point of −19° C.), acetaldehyde (boiling point of 20° C.), propionaldehyde (boiling point of 48° C.), a compound prepared by adding 0 to 2 mol of AO to allyl alcohol and the like. (t) is often generated in an amount of 0.0001 to 10% by weight based on the weight of the polyoxyalkylene polyol or monool (S) in case of the addition of AO.

When AO is added to the active hydrogen-containing compound (J), three kinds of the active hydrogen-containing compound (J), AO and the catalyst (C) may be collectively charged and reacted, or AO may be added dropwise to a mixture of the active hydrogen-containing compound (J) and the catalyst (C), followed by reaction, or AO and the catalyst (C) may be added dropwise to the active hydrogen-containing compound (J), followed by reaction. From the viewpoint of control of the reaction temperature, the method of adding dropwise AO to a mixture of the active hydrogen-containing compound (J) and the catalyst (C), or the method of adding dropwise AO and the catalyst (C) to the active hydrogen-containing compound (J) is preferred.

The reaction temperature when AO is added to the active hydrogen-containing compound (J) is preferably from 0° C. to 250° C., and more preferably from 20° C. to 180° C.

The active hydrogen compound (K) obtained by the above-mentioned method contains the catalyst (C), and the decomposition and/or removal treatment of the catalyst (C) is/are optionally carried out according to the applications.

Examples of the decomposition method include a method of adding water and/or an alcohol compound and, optionally, basic substances such as an alkali compound. It is possible to use, as the alcohol compound, the aforementioned alcohol and/or phenol. Examples of the alkali compound include alkali metal hydroxides (potassium hydroxide, sodium hydroxide, cesium hydroxide, etc.), alkali metal alcoholates (potassium methylate, sodium methylate, etc.) and a mixture of two or more kinds of these compounds. Among these compounds, alkali metal hydroxides are preferred from the viewpoint of productivity. In case of the decomposition, the decomposition temperature is preferably from 10 to 180° C., and more preferably from 80 to 150° C. The decomposition may be performed in a closed state, or performed while exhausting air in a state of being connected to a source of vacuum, or performed while continuously adding water or an alcohol compound. The water and/or alcohol may be added in a state of a liquid, or may be added in a state of steam or solid. The amount of the water and/or alcohol compound used is preferably from 0.1 to 100% by weight, and more preferably from 1 to 20% by weight, based on the weight of the obtained addition product. The amount of the alkali compound used is preferably from 0.1 to 10% by weight, and more preferably from 0.3 to 2% by weight, based on the weight of the obtained addition product.

Removal may be carried out by any conventionally known method. For example, it is possible to use hydrotalcite-based adsorbents {Kyoward 500, Kyoward 1000 and Kyoward 2000 (all of which are manufactured by Kyowa Chemical Industry Co., Ltd.)}; filter aids such as diatomaceous earth {Radiorite 600, Radiorite 800 and Radiorite 900 (all of which are manufactured by Showa Chemical Industry Co., Ltd.)}; and the like. The filtration may be either pressure filtration or filtration under reduced pressure, and pressure filtration is preferred since it is easy to prevent mixing of oxygen. There is no particular limitation on the material of a filter. Examples thereof include paper, polypropylene, polytetrafluoroethylene, polyester, polyphenylene sulfide, acryl, metaaramid and the like, and paper is preferred. The retained particle diameter of a filter is preferably from 0.1 to 10 μm, and more preferably from 1 to 5 μm.

Even if the catalyst (C) remains in the polyoxyalkylene polyol or monool (S), significant adverse influence is not exerted on reactivity between the polyol and the isocyanate in the subsequent, for example, urethanation reaction when compared with a conventional alkali-based catalyst. However, it is preferred that the remaining catalyst is decomposed and/or removed from the viewpoint of the prevention of coloration of the polyurethane resin.

The polyoxyalkylene polyol or monool (S) of the present invention (particularly di- to octa-hydric or higher polyhydric polyoxyalkylene polyol) can be used for various applications, and is suitably used to produce a foamed or non-foamed polyurethane resin.

That is, when a polyol component is reacted with an organic polyisocyanate component (V), optionally, in the presence of an additive to produce a foamed or non-foamed polyurethane resin, a polyoxyalkylene polyolpolyol or monool (S) is used as at least a part of the polyol component.

Use of (S) as at least a part of the polyol component also includes use of a polymer alcohol (W) obtained by polymerizing a vinyl monomer (g) in (S).

The polymer alcohol (W) is a polymer alcohol in which polymer particles (P) are dispersed in (S).

The polymer alcohol (W) can be produced by polymerizing the vinyl monomer (g) in (S) (preferably polyoxyalkylene polyol) using a known method. Examples of the polymer alcohol include those in which the vinyl monomer (g) is polymerized in (S) in the presence of a radical polymerization initiator, and the obtained polymer of (g) is stably dispersed. Specific examples of the polymerization method include methods described in U.S. Pat. No. 3,383,351, Japanese Examined Patent Publication No. 39-25737 and the like. Styrene and/or acrylonitrile is/are preferred as (g).

It is possible to use, as the organic polyisocyanate component (V), those which have conventionally been used in the production of a polyurethane. Examples of the isocyanate include an aromatic polyisocyanate, an aliphatic polyisocyanate, an alicyclic polyisocyanate, an aromatic-aliphatic polyisocyanate, modified polyisocyanates thereof (for example, urethane group-, carbodiimide group-, allophanate group-, urea group-, burette group-, isocyanurate group-, oxazolidone group-containing modified polyisocyanate, etc.) and a mixture of two or more kinds of these polyisocyanates.

Examples of the aromatic polyisocyanate include an aromatic diisocyanate having 6 to 16 carbon atoms (excluding carbon atoms in the NCO group; the same shall apply to the following isocyanate), an aromatic triisocyanate having 6 to 20 carbon atoms, crude products of these isocyanates and the like. Specific examples thereof include 1,3- and/or 1,4-phenylene diisocyanate, 2,4- and/or 2,6-tolylene diisocyanate (TDI), crude TDI, 2,4'- and/or 4,4'-diphenylmethane diisocyanate (MDI), polymethylenepolyphenyl isocyanate (crude MDI) and the like.

Examples of the aliphatic polyisocyanate include an aliphatic diisocyanate having 6 to 10 carbon atoms and the like. Specific examples thereof include 1,6-hexamethylene diisocyanate, lysine diisocyanate and the like.

Examples of the alicyclic. polyisocyanate include an alicyclic diisocyanate having 6 to 16 carbon atoms and the like. Specific examples thereof include isophorone diisocyanate (IPDI), 4,4'-dicyclohexylmethane diisocyanate, norbornane diisocyanate and the like.

Examples of the aromatic-aliphatic polyisocyanate include an aromatic-aliphatic diisocyanate having 8 to 12 carbon atoms and the like. Specific examples thereof include xylylene diisocyanate, α,α,α',α'-tetramethylxylylene diisocyanate and the like.

Specific examples of the modified polyisocyanate include urethane-modified MDI, carbodiimide-modified MDI and the like.

In case of the production of the polyurethane resin of the present invention, the reaction may be optionally carried out in the presence of the additive described below.

In case of producing a polyurethane foam, a blowing agent is used.

Known blowing agents can be used as the blowing agent, and examples thereof include water, a hydrogen atom-containing halogenated hydrocarbon, a low boiling point hydrocarbon, a liquefied carbon dioxide gas and the like, and two or more kinds of these blowing agents may be used in combination.

Specific examples of the hydrogen atom-containing halogenated hydrocarbon include a methylene chloride or HCFC (hydrochlorofluorocarbon) type halogenated hydrocarbon (for example, HCFC-123 and HCFC-141b); a HFC (hydrofluorocarbon) type halogenated hydrocarbon (for example, HFC-245fa and HFC-365mfc) and the like.

The low boiling point hydrocarbon is a hydrocarbon whose boiling point is usually from −5 to 70° C., and specific examples thereof include butane, pentane and cyclopentane.

The amount of the blowing agent used is preferably from 0.1 to 30 parts, and more preferably from 1 to 20 parts, based on 100 parts of the polyol component when the blowing agent is water. It is preferably 50 parts or less, and more preferably from 10 to 45 parts in the case of the hydrogen atom-containing halogenated hydrocarbon. It is preferably 40 parts or less, and more preferably from 10 to 30 parts in the case of the low boiling point hydrocarbon. It is preferably 30 parts or less, and more preferably from 1 to 25 parts in the case of the liquefied carbon dioxide gas.

Parts mean by weight in the above-mentioned or below description.

It is also possible to react in the presence of known additives, for example, a foam stabilizer (dimethylsiloxane-based foam stabilizer, polyether-modified dimethylsiloxane-based foam stabilizer, etc.), a urethanation catalyst (tertiary amine-based catalyst (triethylenediamine, N-ethylmorpholine, diethylethanolamine, N,N,N',N'-tetramethylhexamethylenediamine, tetramethylethylenediamine, diaminobicyclooctane, 1,2-dimethylimidazole, 1-methylimidazole and 1,8-diazabicyclo-[5,4,0]-undecene-7, etc.) and/or a meal catalyst (stannous octoate, dibutyltin(II) dilaurate, lead octoate, etc.))), a coloring agent (dye and pigment), a plasticizer (phthalic acid ester, adipic acid ester, etc.), an organic filler (synthetic short fiber, hollow microsphere made of a thermoplastic or thermosetting resin, etc.), a flame retardant (phosphoric acid ester, halogenated phosphoric acid ester, etc.), an age inhibitor (triazole, benzophenone, etc.), an antioxidant (hindered phenol, hindered amine, etc.) and the like.

With respect to the amount of these additives used based on 100 parts of the polyol component, it is preferably 10 parts or less, and more preferably from 0.5 to 5 parts in the case of the foam stabilizer. It is preferably 10 parts or less, and more preferably from 0.2 to 5 parts in the case of the urethanation catalyst. It is preferably, 1 part or less in the case of the coloring agent. It is preferably 10 parts or less, and more preferably 5 parts or less in the case of the plasticizer. It is preferably 50 parts or less, and more preferably 30 parts or less in the case of the organic filler. It is preferably 30 parts or less, and more preferably from 5 to 20 parts in the case of the flame retardant. It is preferably 1 part or less, and more preferably from 0.01 to 0.5 parts in the case of the age inhibitor. It is preferably 1 part or less, and more preferably from 0.01 to 0.5 parts in the case of the antioxidant. The total amount of the additives used is preferably 50 parts or less, and more preferably from 0.2 to 30 parts.

Isocyanate index (NCO INDEX) [equivalent ratio of (NCO group/active hydrogen atom-containing group)×100] in the production of the polyurethane resin of the present invention is preferably from 80 to 150, more preferably from 85 to 135, and particularly preferably from 90 to 130.

The conditions under which the polyol component is reacted with the organic polyisocyanate component (V) may be known conditions usually used.

For example, first, a polyol component and, optionally, additives are mixed in a predetermined amount. Then, this mixture and polyisocyanate are quickly mixed using a polyurethane low-pressure or high-pressure injection foaming machine or a stirrer. The obtained mixed solution is injected into a closed-type or open-type mold (made of a metal or resin), subjected to urethanation reaction and then cured for a predetermined time, followed by demolding to obtain a polyurethane resin.

EXAMPLES

The present invention will be further described below by way of example, but the present invention is not limited thereto.

Example 1

Figure 2:
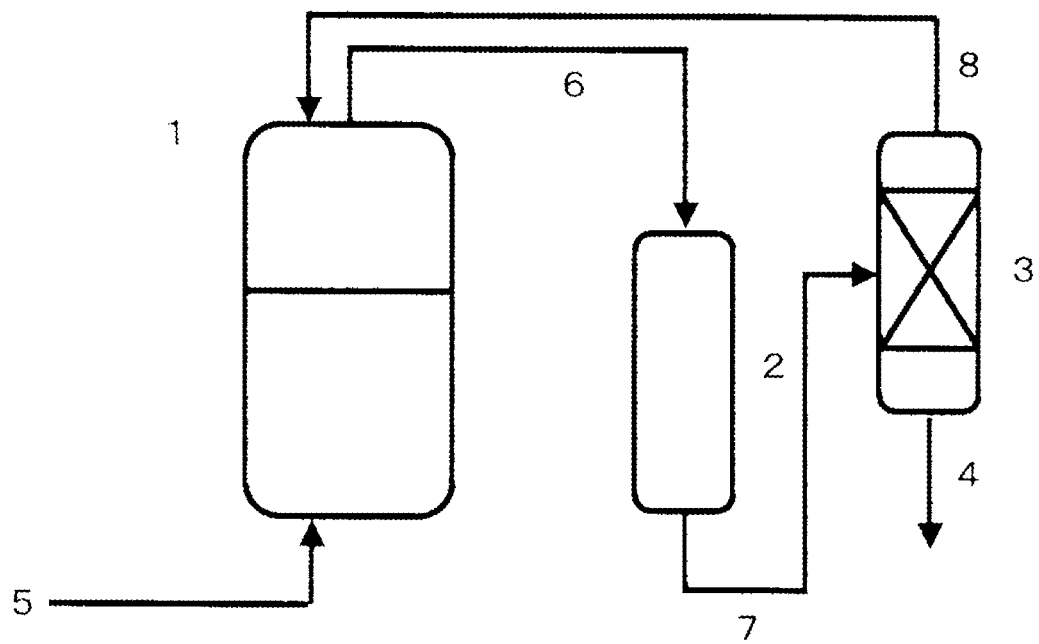
FIG. 2 is a diagram showing a reaction apparatus of Example 1

Like the aspect shown in FIG. 2, an autoclave made of stainless steel as a reaction vessel (1) (having a capacity of 2500 ml) equipped with a stirrer, a temperature control device and a raw material supply line (5) was connected to a reaction column (2) (using two cylindrical tubes made of stainless steel, each measuring 5.5 cm in inner diameter and 30 cm in length) filled with 400 parts of magnesium oxide (granules, diameter of 2 to 0.1 mm) and a distillation column (3) (theoretical plate number of 30, cylindrical tube made of stainless steel, 5.5 cm in inner diameter and 2 m in length) through circulation lines (6), (7), (8).

In the reaction vessel (1), 400 g of a PO adduct of glycerin (hydroxyl value of 280) and 0.09 g of tris(pentafluorophenyl) borane were charged, and then each pressure in the autoclave {reaction vessel (1)} and the reaction column (2), and the circulation lines (6), (7), (8) was reduced to 0.005 MPa. While continuously charging PO in a liquid phase through the raw material supply line (5) with controlling so as to maintain the reaction temperature at 50 to 60° C., a vapor phase in the reaction vessel (1) was circulated at a flow rate of 5 L/minute in the order of the reaction vessel (1)→the circulation line (6)→the reaction column (2)→the circulation line (7)→the distillation column (3)→the circulation line (8)→the reaction vessel (1), using a diaphragm pump. While controlling the reaction column (2) (75° C., 0.08 to 0.15 MPa), a low boiling point compound as a by-product was continuously brought into contact with magnesium oxide to form a high boiling point compound, which was removed out of the system by separating from PO in the distillation column (3). The separated high boiling point compound was extracted through a line under column (4) of the distillation column (3). At the time when the amount of the liquid in the autoclave {reaction vessel (1)} reached 2000 ml, charge of PO was stopped and circulation of the vapor phase was completed, followed by aging at 70° C. for 4 hours, addition of 200 g of water and further heating at 130 to 140° C. for 1 hour. After heating for 1 hour, water was distilled off under normal pressure over 2 hours. Subsequently, the remaining water was distilled off under reduced pressure over 3 hours while introducing steam and maintaining the pressure at 30 to 50 torr to obtain a liquid glycerin PO adduct (S-1).

The PO adduct of glycerin used as a raw material is synthesized by a known method, that is, produced by adding a predetermined amount of propylene oxide to glycerin using potassium hydroxide as a catalyst, and adding water and synthetic silicate (Kyoward 600, manufactured by Kyowa Chemical Industry Co., Ltd.), followed by a heat treatment, filtration and further dehydration under reduced pressure for removal of the catalyst.

Example 2

Figure 3:
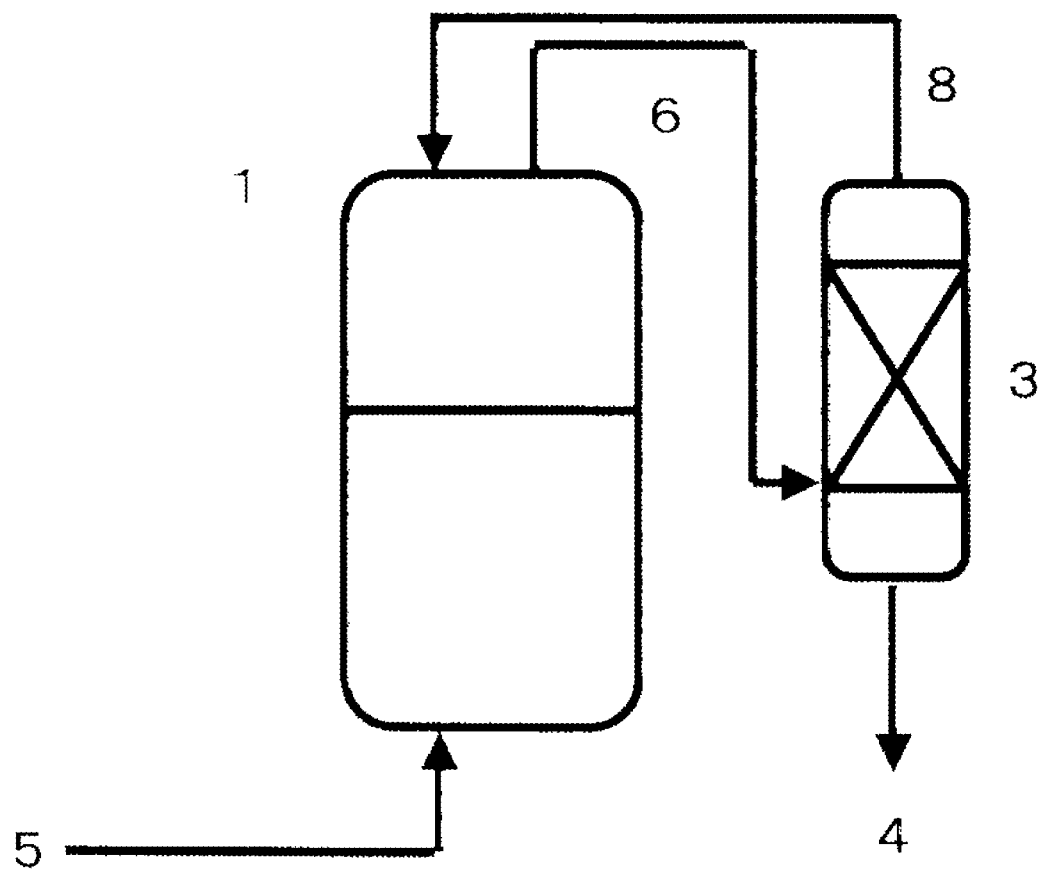
FIG. 3 is a diagram showing a reaction apparatus of Examples 2 and 6.

Like the aspect shown in FIG. 3, an autoclave made of stainless steel as a reaction vessel (1) (having a capacity of 2500 ml) equipped with a stirrer, a temperature control device and a raw material supply line (5) was connected to a distillation column (3) (theoretical plate number of 50, cylindrical tube made of stainless steel, 5.5 cm in inner diameter and 3 m in length) through circulation lines (6), (8).

In the reaction vessel (1), 400 g of a PO adduct of glycerin (hydroxyl value of 280) and 0.09 g of tris(pentafluorophenyl) borane were charged, and then each pressure in the autoclave {reaction vessel (1)} and the reaction column (2), and the circulation lines (6), (8) was reduced to 0.005 MPa. While continuously charging PO in a liquid phase through the raw material supply line (5) with controlling so as to maintain the reaction temperature at 50 to 60° C., a vapor phase in the reaction vessel (1) was circulated at a flow rate of 5 L/minute in the order of the reaction vessel (1)→the circulation line (6)→the distillation column (3)→the circulation line (8)→the reaction vessel (1), using a diaphragm pump. A low boiling point compound as a by-product was removed out of the system by separating from PO in the distillation column (3). The separated low boiling point compound as a by-product was extracted through a line under column (4) of the distillation column (3). At the time when the amount of the liquid in the autoclave {reaction vessel (1)} reached 2000 ml, charge of PO was stopped and circulation of the vapor phase was completed, followed by aging at 70° C. for 4 hours, addition of 200 g of water and further heating at 130 to 140° C. for 1 hour. After heating for 1 hour, water was distilled off under normal pressure over 2 hours. Subsequently, the remaining water was distilled off under reduced pressure over 3 hours while introducing steam and maintaining the pressure at 30 to 50 torr to obtain a liquid glycerin PO adduct (S-2).

The PO adduct of glycerin used as a raw material was the same as that in Example 1.

Example 3

Figure 4:
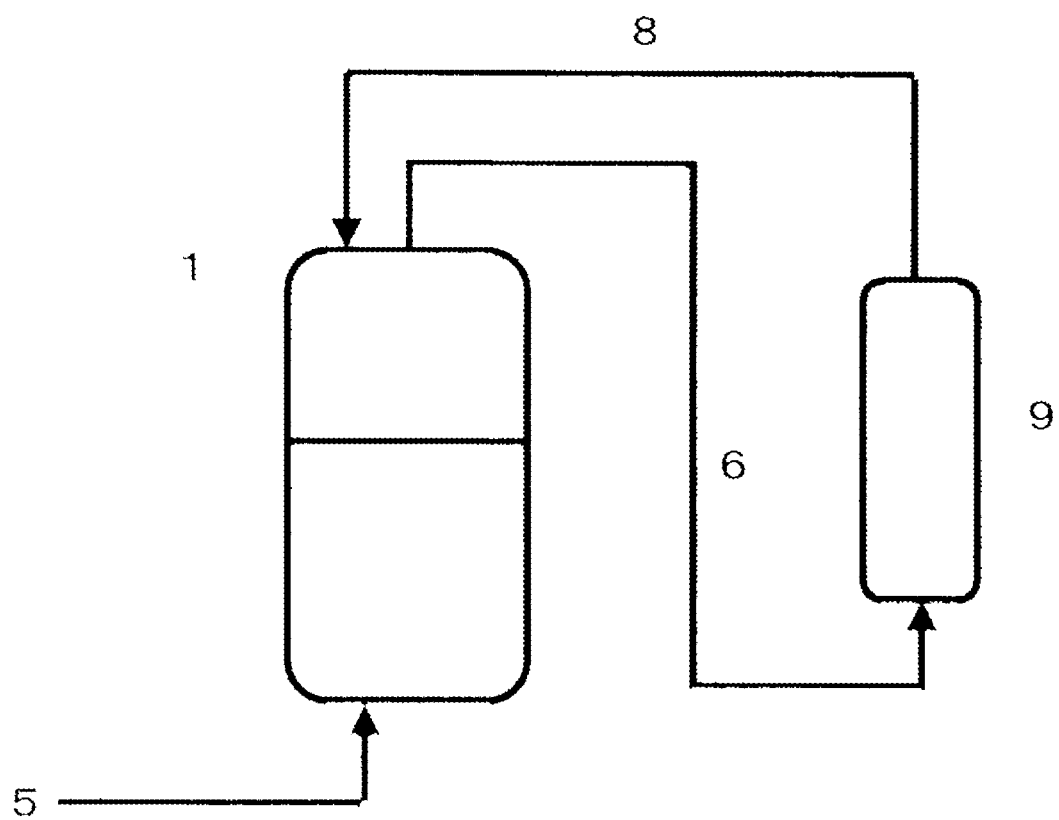
FIG. 4 is a diagram showing a reaction apparatus of Example 3.

Like the aspect shown in FIG. 4, an autoclave made of stainless steel as a reaction vessel (1) (having a capacity of 2500 ml) equipped with a stirrer, a temperature control device and a raw material supply line (5) was connected to an adsorption column (9) (cylindrical tube made of stainless steel, 5.5 cm in inner diameter and 30 cm in length) filled with 500 parts of molecular sieve 4A through circulation lines (6), (8).

A PO adduct (400 g) of glycerin (hydroxyl value of 280) and 0.09 g of tris(pentafluorophenyl) borane were charged, and then each pressure in the autoclave {reaction vessel (1)} and the adsorption column (9), and the lines (6), (8) was reduced to 0.005 MPa. While continuously charging PO through the raw material supply line (5) with controlling so as to maintain the reaction temperature at 50 to 60° C., a vapor phase in the reaction vessel (1) was circulated at a flow rate of 5 L/minute in the order of the reaction vessel (1)→the vacuum line (6)→the adsorption column (9)→the circulation line (8)→the reaction vessel (1), using a diaphragm pump. While controlling the adsorption column (9) (25° C., 0.1 to 0.3 MPa), a low boiling point compound as a by-product was continuously adsorbed to molecular sieve and removed out of the system. At the time when the amount of the liquid in the autoclave {reaction vessel (1)} reached 2000 ml, charge of PO was stopped and circulation of the vapor phase was completed, followed by aging at 70° C. for 4 hours, addition of 200 g of water and further heating at 130 to 140° C. for 1 hour. After heating for 1 hour, water was distilled off under normal pressure over 2 hours. Subsequently, the remaining water was distilled off under reduced pressure over 3 hours while introducing steam and maintaining the pressure at 30 to 50 torr to obtain a liquid glycerin PO adduct (S-3).

The PO adduct of glycerin used as a raw material was the same as that in Example 1.

Example 4

Figure 5:
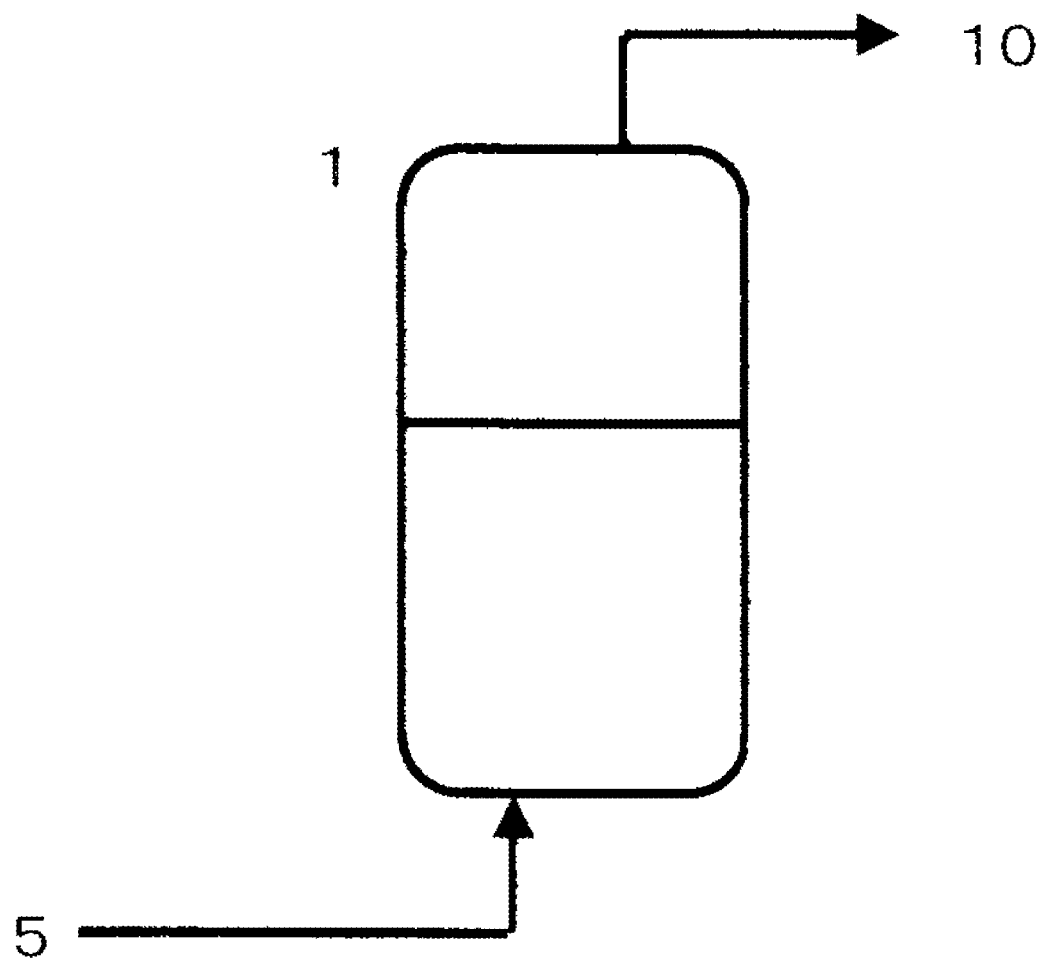
FIG. 5 is a diagram showing a reaction apparatus of Example 4.

Like the aspect shown in FIG. 5, to an autoclave made of stainless steel as a reaction vessel (1) (having a capacity of 2500 ml) equipped with a stirrer, a temperature control device and a raw material supply line (5), a vacuum line (10) was connected. In the autoclave {reaction vessel (1)}, 400 g of a PO adduct of glycerin (hydroxyl value of 280) and 0.09 g of tris(pentafluorophenyl) borane were charged, and then PO was charged through the raw material supply line (5) while controlling so as to maintain the reaction temperature at 50 to 60° C. However, charge of PO was carried out by repeating the step of charging over 10 minutes, reducing the pressure (0.01 MPa) through the vacuum line (10) and then distilling off a low boiling point volatile component for 15 minutes in 20 times. At the time when the amount of the liquid in the autoclave {reaction vessel (1)} reached 2000 ml, charge of PO was stopped, followed by aging at 70° C. for 4 hours, addition of 200 g of water and further heating at 130 to 140° C. for 1 hour. After heating for 1 hour, water was distilled off under normal pressure over 2 hours. Subsequently, the remaining water was distilled off under reduced pressure over 3 hours while introducing steam and maintaining the pressure at 30 to 50 torr to obtain a liquid glycerin PO adduct (S-4).

The PO adduct of glycerin used as a raw material was the same as that in Example 1.

Example 5

In the same manner as in Example 1, except that 666 g of a PO adduct of glycerin (hydroxyl value of 168) was used in place of using 400 g of the PO adduct of glycerin (hydroxyl value of 280), the synthesis was performed to obtain a liquid glycerin PO adduct (S-5).

The PO adduct of glycerin (hydroxyl value of 168) used as a raw material is synthesized by a known method, that is, produced by adding a predetermined amount of propylene oxide to glycerin using potassium hydroxide as a catalyst, and adding water and synthetic silicate (Kyoward 600, manufactured by Kyowa Chemical Industry Co., Ltd.), followed by a heat treatment, filtration and further dehydration under reduced pressure for removal of the catalyst.

Example 6

Like the aspect shown in FIG. 2, an autoclave made of stainless steel as a reaction vessel (1) (having a capacity of 2500 ml) equipped with a stirrer, a temperature control device and a raw material supply line (5) was connected to a reaction column (2) (using two cylindrical tubes made of stainless steel, each measuring 5.5 cm in inner diameter and 30 cm in length) filled with 400 parts of magnesium oxide (granules, diameter of 2 to 0.1 mm) and a distillation column (3) (theoretical plate number of 30, cylindrical tube made of stainless steel, 5.5 cm in inner diameter and 2 m in length) through circulation lines (6), (7), (8).

In the reaction vessel (1), 400 g of a PO adduct of glycerin (hydroxyl value of 280) and 0.09 g of tris(pentafluorophenyl) borane were charged, and then each pressure in the autoclave {reaction vessel (1)} and the reaction column (2), and the circulation lines (6), (7), (8) was reduced to 0.005 MPa. While continuously charging PO in a liquid phase through the raw material supply line (5) with controlling so as to maintain the reaction temperature at 50 to 60° C., a vapor phase in the autoclave {reaction vessel (1)} was circulated at a flow rate of 5 L/minute in the order of the reaction vessel (1)→the circulation line (6)→the reaction column (2)→the circulation line (7)→the distillation column (3)→the circulation line (8)→the reaction vessel (1), using a diaphragm pump. While controlling the reaction column (2) (75° C., 0.08 to 0.15 MPa), a low boiling point compound as a by-product was continuously brought into contact with magnesium oxide to form a high boiling point compound, which was removed out of the system by separating from PO in the distillation column (3). The separated high boiling Point compound was extracted through a line under column (4) of the distillation column (3). At the time when the amount of the liquid in the autoclave {reaction vessel (1)} reached 1920 ml, charge of PO was stopped and circulation of the vapor phase was completed, followed by aging at 70° C. for 4 hours, addition of 170 g of water and further heating at 130 to 140° C. for 1 hour. After water was distilled off under normal pressure over 2 hours, 2 g of potassium hydroxide was added and the remaining water was distilled off under reduced pressure while introducing steam at 130 to 140° C. with maintaining the pressure at 30 to 50 torr. Subsequently, 80 g of EO was charged over 2 hours through the raw material supply line (5) while controlling so as to maintain the reaction temperature at 130 to 140° C., followed by aging for 2 hours. After cooling to 90° C., 12 g of Kyoward 600 (synthetic silicate, manufactured by Kyowa Chemical Industry Co., Ltd.) and 40 g of water were added, followed by a treatment for 1 hour. The reaction product was taken out from the autoclave {reaction vessel (1)}, filtered using 1 micron filter paper and then dehydrated under reduced pressure to obtain a liquid glycerin POEO adduct (S-6).

The PO adduct of glycerin used as a raw material was the same as that in Example 1.

Example 7

In the same manner as in Example 6, except that 666 g of a PO adduct of glycerin (hydroxyl value of 168) was used in place of 400 g of the PO adduct of glycerin (hydroxyl value of 280), the synthesis was performed to obtain a liquid glycerin POEO adduct (S-7).

The PO adduct of glycerin used as a raw material was the same as that in Example 5.

Example 8

In the same manner as in Example 1, except that 240 g of a PO adduct of glycerin (hydroxyl value of 280) was used in place of 400 g of the PO adduct of glycerin (hydroxyl value of 280), the synthesis was performed to obtain a liquid glycerin PO adduct (S-8).

Example 9

In the same manner as in Example 2, except that 400 g of a PO adduct of glycerin (hydroxyl value of 168) was used in place of 400 g of the PO adduct of glycerin (hydroxyl value of 280), the synthesis was performed to obtain a liquid glycerin PO adduct (S-9).

The PO adduct of glycerin used as a raw material was the same as that in Example 5.

Example 10

In the same manner as in Example 6, except that 240 g of a PO adduct of glycerin (hydroxyl value of 280) was used in place of 400 g of the PO adduct of glycerin (hydroxyl value of 280), that "charge of PO was stopped at the time when the amount of the liquid in the autoclave {reaction vessel (1)} reached 1800 ml" in place of "stopping charge of PO at the time when the amount of the liquid in the autoclave {reaction vessel (1)} reached 1920 ml", and that "200 g of EO" was used in place of "80 g of EO", the synthesis was performed to obtain a liquid glycerin POEO adduct (S-10).

Example 11

In the same manner as in Example 10, except that 400 g of a PO adduct of glycerin (hydroxyl value of 168) was used in place of 400 g of the PO adduct of glycerin (hydroxyl value of 280), the synthesis was performed to obtain a liquid glycerin POEO adduct (S-11).

The PO adduct of glycerin used as a raw material was the same as that in Example 5.

Example 12

In the same manner as in Example 2, except that 400 g of a PO adduct of propylene glycol (hydroxyl value of 280) was used in place of 400 g of the PO adduct of glycerin (hydroxyl value of 280), the synthesis was performed to obtain a liquid propylene glycol PO adduct (S-12).

The PO adduct of propylene glycol (hydroxyl value of 280) is synthesized by a known method, that is, produced by adding a predetermined amount of propylene oxide to propylene glycol using potassium hydroxide as a catalyst, and adding water and synthetic silicate (Kyoward 600, manufactured by Kyowa Chemical Industry Co., Ltd.), followed by a heat treatment, filtration and further dehydration under reduced pressure for removal of the catalyst.

Example 13

In the same manner as in Example 2, except that 666 g of a PO adduct of propylene glycol (hydroxyl value of 168) was used in place of 400 g of the PO adduct of glycerin (hydroxyl value of 280), the synthesis was performed to obtain a liquid propylene glycol PO adduct (S-13).

The PO adduct of propylene glycol (hydroxyl value of 168) is synthesized by a known method, that is, produced by adding a predetermined amount of propylene oxide to propylene glycol using potassium hydroxide as a catalyst, and adding water and synthetic silicate (Kyoward 600, manufactured by Kyowa Chemical Industry Co., Ltd.), followed by a heat treatment, filtration and further dehydration under reduced pressure for removal of the catalyst.

Example 14

In the same manner as in Example 6, except that 400 g of a PO adduct of propylene glycol (hydroxyl value of 280) was used in place of 400 g of the PO adduct of glycerin (hydroxyl value of 280), that "charge of PO was stopped at the time when the amount of the liquid in the autoclave {reaction vessel (1)} reached 1400 ml" in place of "stopping charge of PO at the time when the amount of the liquid in the autoclave {reaction vessel (1)} reached 1920 ml", and that "600 g of EO" was used in place of "80 g of EO", the synthesis was performed to obtain a liquid propylene glycol POEO adduct (S-14).

The PO adduct of propylene glycol (hydroxyl value of 280) used was the same as that in Example 12.

Example 15

In the same manner as in Example 14, except that 666 g of a PO adduct of propylene glycol (hydroxyl value of 168) was used in place of 400 g of the PO adduct of propylene glycol (hydroxyl value of 280), the synthesis was performed to obtain a liquid propylene glycol POEO adduct (S-15).

The PO adduct of propylene glycol (hydroxyl value of 168) used was the same as that in Example 13.

Example 16

In the same manner as in Example 6, except that 267 g of a PO adduct of pentaerythritol (hydroxyl value of 280) was used in place of 400 g of the PO adduct of glycerin (hydroxyl value of 280), that "charge of PO was stopped at the time when the amount of the liquid in the autoclave {reaction vessel (1)} reached 1840 ml" in place of "stopping charge of PO at the time when the amount of the liquid in the autoclave {reaction vessel (1)} reached 1920 ml", and that "160 g of EO" was used in place of "80 g of EO", the synthesis was performed to obtain a liquid pentaerythritol POEO adduct (S-16).

The pentaerythritol PO adduct (hydroxyl value of 280) is synthesized by a known method, that is, produced by adding a predetermined amount of propylene oxide to propylene glycerin using potassium hydroxide as a catalyst, and adding water and synthetic silicate (Kyoward 600, manufactured by Kyowa Chemical Industry Co., Ltd.), followed by a heat treatment, filtration and further dehydration under reduced pressure for removal of the catalyst.

Example 17

In the same manner as in Example 16, except that 466 g of a PO adduct of pentaerythritol (hydroxyl value of 160) was used in place of 267 g of the PO adduct of pentaerythritol (hydroxyl value of 280), the synthesis was performed to obtain a liquid pentaerythritol POEO adduct (S-17).

The pentaerythritol PO adduct (hydroxyl value of 160) is synthesized by a known method, that is, produced by adding a predetermined amount of propylene oxide to propylene glycol using potassium hydroxide as a catalyst, and adding water and synthetic silicate (Kyoward 600, manufactured by Kyowa Chemical Industry Co., Ltd.), followed by a heat treatment, filtration and further dehydration under reduced pressure for removal of the catalyst.

Example 18

In the same manner as in Example 16, except that 200 g of a PO adduct of pentaerythritol (hydroxyl value of 280) was used in place of 400 g of the PO adduct of pentaerythritol (hydroxyl value of 280), the synthesis was performed to obtain a liquid pentaerythritol POEO adduct (S-18).

Example 19

In the same manner as in Example 18, except that 350 g of a PO adduct of pentaerythritol (hydroxyl value of 160) was used in place of 200 g of the PO adduct of pentaerythritol (hydroxyl value of 280), the synthesis was performed to obtain a liquid pentaerythritol POEO adduct (S-19).

The PO adduct of pentaerythritol (hydroxyl value of 160) used was the same as that in Example 17.

Comparative Example 1

Figure 6:
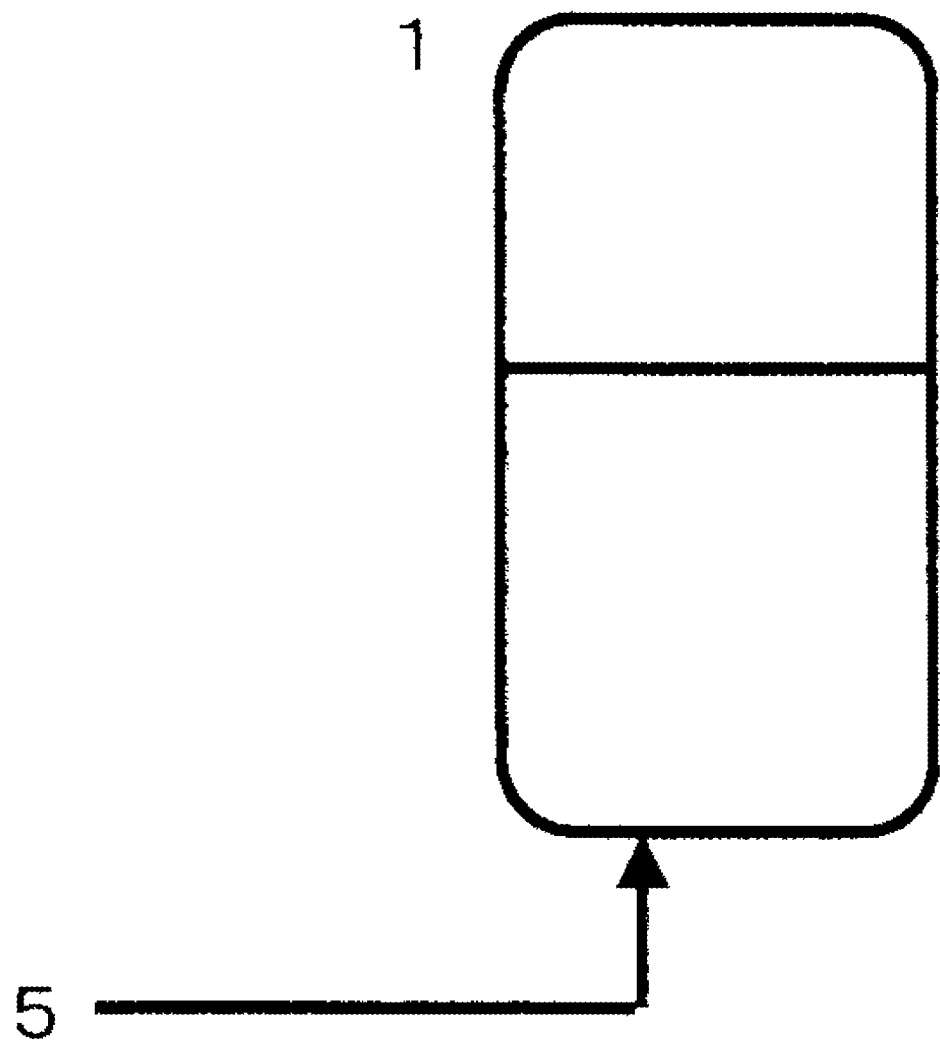
FIG. 6 is a diagram showing a reaction apparatus of Comparative Examples 1, 3, 4 and 6.

Like the aspect shown in FIG. 6, 80 g of glycerin and 4.0 g of cesium hydroxide were charged in an autoclave made of stainless steel as a reaction vessel (1) (having a capacity of 2500 ml) equipped with a stirrer, a temperature control device and a raw material supply line (5), and then PO was charged through the raw material supply line (5) while controlling so as to maintain the reaction temperature at 90 to 100° C. However, charge of PO was continuously carried out over 6 hours. After charging until the amount of the liquid in the autoclave {reaction vessel (1)} reached 2000 ml, aging was performed at 100° C. for 3 hours. Then, 30 g of a synthetic silicate (Kyoward 600, manufactured by Kyowa Chemical Industry Co., Ltd.) and 40 g of water were added, followed by a treatment at 90° C. for 1 hour. The reaction product was taken out from the autoclave {reaction vessel (1)}, filtered with 1 micron filter paper and then dehydrated for 2 hours to obtain a liquid glycerin PO adduct. After charging again 1530 g of the obtained glycerin PO adduct and 0.09 g of tris(pentafluorophenyl) borane in the autoclave {reaction vessel (1)}, PO was charged through the raw material supply line (5) over 3 hours while controlling so as to maintain the reaction temperature at 70 to 80° C. After charging until the amount of the liquid in the autoclave {reaction vessel (1)} reached 2000 ml, aging was performed at 70° C. for 3 hours. Subsequently, 200 g of water was added, followed by heating at 130 to 140° C. for 1 hour. After heating for 1 hour, water was distilled off under normal pressure over 2 hours. Subsequently, the remaining water was distilled off under reduced pressure over 3 hours while introducing steam and maintaining the pressure at 30 to 50 torr to obtain a liquid glycerin PO adduct (n-1).

Comparative Example 2

In the same manner as in Comparative Example 1, except that 4.0 g of potassium hydroxide was used in place of 4.0 g of cesium hydroxide, a liquid glycerin PO adduct (n-2) was obtained.

Comparative Example 3

Like the aspect shown in FIG. 6, 61 g of glycerin and 4.0 g of potassium hydroxide were charged in an autoclave made of stainless steel as a reaction vessel (1) (having a capacity of 2500 ml) equipped with a stirrer, a temperature control device and a raw material supply line (5), and then PO was charged through the raw material supply line (5) while controlling so as to maintain the reaction temperature at 90 to 100° C. However, charge of PO was continuously carried out over 6 hours. After charging until the amount of the liquid in the autoclave {reaction vessel (1)} reached 2000 ml, aging was performed at 100° C. for 3 hours. Then, 30 g of a synthetic silicate (Kyoward 600, manufactured by Kyowa Chemical Industry Co., Ltd.) and 40 g of water were added, followed by a treatment at 90° C. for 1 hour. The reaction product was taken out from the autoclave {reaction vessel (1)}, filtered with 1 micron filter paper and then dehydrated for 2 hours to obtain a liquid glycerin PO adduct (n-3).

Comparative Example 4

Like the aspect shown in FIG. 6, 84 g of glycerin and 4.0 g of cesium hydroxide were charged in an autoclave made of stainless steel as a reaction vessel (1) (having a capacity of 2500 ml) equipped with a stirrer, a temperature control device and a raw material supply line (5), and then PO was charged through the raw material supply line (5) while controlling so as to maintain the reaction temperature at 90 to 100° C. However, charge of PO was continuously carried out over 6 hours. After charging until the amount of the liquid in the autoclave {reaction vessel (1)} reached 2000 ml, aging was performed at 100° C. for 3 hours. Then, 30 g of a synthetic silicate (Kyoward 600, manufactured by Kyowa Chemical Industry Co., Ltd.) and 40 g of water were added, followed by a treatment at 90° C. for 1 hour. The reaction product was taken out from the autoclave {reaction vessel (1)}, filtered with 1 micron filter paper and then dehydrated for 2 hours to obtain a liquid glycerin PO adduct. After charging again 1460 g of the obtained glycerin PO adduct and 0.09 g of tris(pentafluorophenyl) borane in the autoclave {reaction vessel (1)}, PO was charged through the raw material supply line (5) over 3 hours while controlling so as to maintain the reaction temperature at 70 to 80° C. Charge of PO was stopped at the time when the amount of the liquid in the autoclave {reaction vessel (1)} reached 1920 ml, followed by aging at 70° C. for 4 hours. Subsequently, 170 g of water was added, followed by heating at 130 to 140° C. for 1 hour. After water was distilled off under normal pressure over 2 hours, 2 g of potassium hydroxide was added and the remaining water was distilled off under reduced pressure while introducing steam at 130 to 140° C. and maintaining the pressure at 30 to 50 torr. Subsequently, 80 g of EO was charged through the raw material supply line (5) over 2 hours while controlling so as to maintain the reaction temperature at 130 to 140° C., followed by aging for 2 hours. After cooling to 90° C., 12 g of Kyoward 600 (synthetic silicate, manufactured by Kyowa Chemical Industry Co., Ltd.) and 40 g of water were added, followed by a treatment for 1 hour. The reaction product was taken out from the autoclave {reaction vessel (1)}, filtered using 1 micron filter paper and then dehydrated under reduced pressure to obtain a liquid glycerin POEO adduct (n-4).

Comparative Example 5

In the same manner as in Comparative Example 4, except that 4 g of potassium hydroxide was used in place of 4 g of cesium hydroxide, a liquid glycerin POEO adduct (n-5) was obtained.

Comparative Example 6

Like the aspect shown in FIG. 6, 61 g of glycerin and 4.0 g of potassium hydroxide were charged in an autoclave made of stainless steel as a reaction vessel (1) (having a capacity of 2500 ml) equipped with a stirrer, a temperature control device and a raw material supply line (5), and then PO was charged through the raw material supply line (5) while controlling so as to maintain the reaction temperature at 90 to 100° C. However, charge of PO was continuously carried out over 6 hours. After charging until the amount of the liquid in the autoclave {reaction vessel (1)} reached 1860 ml, aging was performed at 100° C. for 3 hours. Subsequently, 140 g of EO was charged through the raw material supply line (5) over 2 hours while controlling so as to maintain the reaction temperature at 130 to 140° C., followed by aging for 2 hours. After cooling to 90° C., 12 g of Kyoward 600 (synthetic silicate, manufactured by Kyowa Chemical Industry Co., Ltd.) and 40 g of water were added, followed by a treatment for 1 hour. The reaction product was taken out from the autoclave {reaction vessel (1)}, filtered using 1 micron filter paper and then dehydrated under reduced pressure to obtain a liquid glycerin POEO adduct (n-6).

Comparative Example 7

In the same manner as in Comparative Example 1, except that 42 g of glycerin was used in place of 80 g of glycerin, and that 1530 g of the glycerin PO adduct to be charged in the reaction vessel (1) was changed to 1720 g of a glycerin PO adduct, a glycerin PO adduct (n-7) was obtained.

Comparative Example 8

In the same manner as in Comparative Example 2, except that 42 g of glycerin was used in place of 80 g of glycerin, and that 1530 g of the glycerin PO adduct to be charged in the reaction vessel (1) was changed to 1720 g of a glycerin PO adduct, a glycerin PO adduct (n-8) was obtained.

Comparative Example 9

In the same manner as in Comparative Example 3, except that 37 g of glycerin was used in place of 61 g of glycerin, a glycerin PO adduct (n-9) was obtained.

Comparative Example 10

In the same manner as in Comparative Example 4, except that 48 g of glycerin was used in place of 84 g of glycerin, that "1520 g of the obtained glycerin PO adduct" was used in place of "1460 g of the obtained glycerin PO adduct", that "charge of PO (charge of PO upon PO addition reaction using tris(pentafluorophenyl) borane as a catalyst) was stopped at the time when the amount of the liquid in the autoclave {reaction vessel (1)} reached 1800 ml" in place of "stopping charge of PO at the time when the amount of the liquid in the autoclave {reaction vessel (1)} reached 1920 ml" and that 200 g of EO was used in place of 80 g of EO, the synthesis was performed to obtain a liquid glycerin POEO adduct (n-10).

Comparative Example 11

In the same manner as in Comparative Example 5, except that 48 g of glycerin was used in place of 84 g of glycerin, that "1520 g of the obtained glycerin PO adduct" was used in place of "1460 g of the obtained glycerin PO adduct", that "charge of PO (charge of PO upon PO addition reaction using tris(pentafluorophenyl) borane as a catalyst) was stopped at the time when the amount of the liquid in the autoclave {reaction vessel (1)} reached 1800 ml" in place of "stopping charge of PO at the time when the amount of the liquid in the autoclave {reaction vessel (1)} reached 1920 ml", and that 200 g of EO was used in place of 80 g of EO, the synthesis was performed to obtain a liquid glycerin POEO adduct (n-11).

Comparative Example 12

In the same manner as in Comparative Example 6, except that 37 g of glycerin was used in place of 61 g of glycerin, that PO was charged "after charging until the amount of the liquid in the autoclave {reaction vessel (1)} reached 1400 ml" in place of "after charging until the amount of the liquid in the autoclave {reaction vessel (1)} reached 1860 ml", and that 600 g of EO was used in place of 140 g of EO, a glycerin POEO adduct (n-12) was obtained.

Comparative Example 13

In the same manner as in Comparative Example 1, except that 120 g of propylene glycol was used in place of 80 g of glycerin, and that 1530 g of the glycerin PO adduct to be charged in the reaction vessel (1) was changed to 1540 g of a propylene glycol PO adduct, a propylene glycol PO adduct (n-13) was obtained.

Comparative Example 14

In the same manner as in Comparative Example 2, except that 120 g of propylene glycol was used in place of 80 g of glycerin, and that 1530 g of the glycerin PO adduct to be charged in the reaction vessel (1) was changed to 1540 g of a propylene glycol PO adduct, a propylene glycol PO adduct (n-14) was obtained.

Comparative Example 15

In the same manner as in Comparative Example 3, except that 72 g of propylene glycol was used in place of 61 g of glycerin, a glycerin PO adduct (n-15) was obtained.

Comparative Example 16

In the same manner as in Comparative Example 4, except that 153 g of propylene glycol was used in place of 84 g of glycerin, that "940 g of the obtained propylene glycol PO adduct" was used in place of "1460 g of the obtained glycerin PO adduct", that "charge of PO (charge of PO upon PO addition reaction using tris(pentafluorophenyl) borane as a catalyst) was stopped at the time when the amount of the liquid in the autoclave {reaction vessel (1)} reached 1400 ml" in place of "stopping charge of PO at the time when the amount of the liquid in the autoclave {reaction vessel (1)} reached 1920 ml", and that 600 g of EO was used in place of 80 g of EO, the synthesis was performed to obtain a liquid propylene glycol POEO adduct (n-16).

Comparative Example 17

In the same manner as in Comparative Example 5, except that 153 g of propylene glycol was used in place of 84 g of glycerin, that "940 g of the obtained propylene glycol PO adduct" was used in place of "1460 g of the obtained glycerin PO adduct", that "charge of PO (charge of PO upon PO addition reaction using tris(pentafluorophenyl) borane as a catalyst) was stopped at the time when the amount of the liquid in the autoclave {reaction vessel (1)} reached 1400 ml" in place of "stopping charge of PO at the time when the amount of the liquid in the autoclave {reaction vessel (1)} reached 1920 ml", and that 600 g of EO was used in place of 80 g of EO, the synthesis was performed to obtain a liquid propylene glycol POEO adduct (n-17).

Comparative Example 18

In the same manner as in Comparative Example 6, except that 72 g of glycerin was used in place of 61 g of glycerin, that PO was charged "after charging until the amount of the liquid in the autoclave {reaction vessel (1)} reached 1400 ml" in place of "after charging until the amount of the liquid in the autoclave {reaction vessel (1)} reached 1860 ml", and that 600 g of EO was used in place of 140 g of EO, the synthesis was performed to obtain a glycerin POEO adduct (n-18).

Comparative Example 19

In the same manner as in Comparative Example 4, except that 59 g of pentaerythritol was used in place of 84 g of glycerin, that "1530 g of the obtained pentaerythritol PO adduct" was used in place of "1460 g of the obtained glycerin PO adduct", that "charge of PO (charge of PO upon PO addition reaction using tris(pentafluorophenyl) borane as a catalyst) was stopped at the time when the amount of the liquid in the autoclave {reaction vessel (1)} reached 1840 ml" in place of "stopping charge of PO at the time when the amount of the liquid in the autoclave {reaction vessel (1)} reached 1920 ml", and that 160 g of EO was used in place of 80 g of EO, the synthesis was performed to obtain a liquid pentaerythritol POEO adduct (n-19).

Comparative Example 20

In the same manner as in Comparative Example 5, except that 59 g of pentaerythritol was used in place of 84 g of glycerin, that "1610 g of the obtained pentaerythritol PO adduct" was used in place of "1460 g of the obtained glycerin PO adduct", that "charge of PO (charge of PO upon PO addition reaction using tris(pentafluorophenyl) borane as a catalyst) was stopped at the time when the amount of the liquid in the autoclave {reaction vessel (1)} reached 1840 ml" in place of "stopping charge of PO at the time when the amount of the liquid in the autoclave {reaction vessel (1)} reached 1920 ml", and that 160 g of EO was used in place of 80 g of EO, the synthesis was performed to obtain a liquid pentaerythritol POEO adduct (n-20).

Comparative Example 21

In the same manner as in Comparative Example 6, except that 45 g of pentaerythritol was used in place of 61 g of glycerin, that PO was charged "after charging until the amount of the liquid in the autoclave {reaction vessel (1)} reached 1840 ml" in place of "after charging until the amount of the liquid in the autoclave {reaction vessel (1)} reached 1860 ml", and that 160 g of EO was used in place of 140 g of EO, a pentaerythritol POEO adduct (n-21) was obtained.

Comparative Example 22

In the same manner as in Comparative Example 4, except that 42 g of pentaerythritol was used in place of 84 g of glycerin, that "1610 g of the obtained pentaerythritol PO adduct" was used in place of "1460 g of the obtained glycerin PO adduct", that "charge of PO (charge of PO upon PO addition reaction using tris(pentafluorophenyl) borane as a catalyst) was stopped at the time when the amount of the liquid in the autoclave {reaction vessel (1)} reached 1840 ml" in place of "stopping charge of PO at the time when the amount of the liquid in the autoclave {reaction vessel (1)} reached 1920 ml", and that 160 g of EO was used in place of 80 g of EO, the synthesis was performed to obtain a liquid pentaerythritol POEO adduct (n-22).

Comparative Example 23

In the same manner as in Comparative Example 5, except that 42 g of pentaerythritol was used in place of 84 g of glycerin, that "1610 g of the obtained pentaerythritol PO adduct" was used in place of "1460 g of the obtained glycerin PO adduct", that "charge of PO (charge of PO upon PO addition reaction using tris(pentafluorophenyl) borane as a catalyst) was stopped at the time when the amount of the liquid in the autoclave {reaction vessel (1)} reached 1840 ml" in place of "stopping charge of PO at the time when the amount of the liquid in the autoclave {reaction vessel (1)} reached 1920 ml", and that 160 g of EO was used in place of 80 g of EO, the synthesis was performed to obtain a liquid pentaerythritol POEO adduct (n-23).

Comparative Example 24

In the same manner as in Comparative Example 6, except that 34 g of pentaerythritol was used in place of 61 g of glycerin, that PO was charged "after charging until the amount of the liquid in the autoclave {reaction vessel (1)} reached 1840 ml" in place of "after charging until the amount of the liquid in the autoclave {reaction vessel (1)} reached 1860 ml", and that 160 g of EO was used in place of 140 g of EO, a liquid pentaerythritol POEO adduct (n-24) was obtained.

The analytical results of the polyoxyalkylene polyols of Examples 1 to 19 were shown in Table 1.

The verification results of the mathematical expression 1 (mathematical expression (4) shown below) described in Patent Document 4 (Japanese Patent No. 3688667), by which the polyoxyalkylene polyol as the prior art is satisfied, were also shown.

$$y \leq (1.9 \times 10^{-8}) w^2 \qquad (4)$$

The mathematical expression (4) is an inequality expression showing a relationship between the hydroxyl group equivalent w and the total degree of unsaturation y and, when the inequality expression is modified into the form corresponding to the mathematical expression (1) or (3) in the present invention, that is, a relational expression between the hydroxyl value x and the total degree of unsaturation y of (S), the mathematical expression (4') is established.

$$y \leq 60 \times x^{-2} \qquad (4')$$

TABLE 1

| | | Polyol | Starting material | Hydroxyl value x | Hydroxyl group equivalent | Primary hydroxyl group ratio (1)* | Primary hydroxyl group ratio (2)* | Degree of unsaturation y | Content of EO z | Right-hand side of mathematical expression 1 | | Right-hand side of mathematical expression 3 | | Right-hand side of mathematical expression 4 | |
|---|---|---|---|---|---|---|---|---|---|---|---|---|---|---|---|
| Examples | 1 | S-1 | Glycerin | 56.1 | 1000 | 69 | 69 | 0.005 | 0 | ○ | 0.009 | ○ | 0.006 | ○ | 0.019 |
| | 2 | S-2 | | 55.9 | 1004 | 71 | 71 | 0.004 | 0 | ○ | 0.009 | ○ | 0.006 | ○ | 0.019 |
| | 3 | S-3 | | 56.0 | 1002 | 70 | 70 | 0.005 | 0 | ○ | 0.009 | ○ | 0.006 | ○ | 0.019 |
| | 4 | S-4 | | 56.0 | 1002 | 70 | 70 | 0.005 | 0 | ○ | 0.009 | ○ | 0.006 | ○ | 0.019 |
| | 5 | S-5 | | 56.1 | 1000 | 70 | 70 | 0.008 | 0 | ○ | 0.009 | X | 0.006 | ○ | 0.019 |
| | 6 | S-6 | | 56.1 | 1000 | 70 | 75 | 0.004 | 4 | ○ | 0.009 | ○ | 0.006 | | |
| | 7 | S-7 | | 56.0 | 1002 | 71 | 75 | 0.008 | 4 | ○ | 0.009 | X | 0.009 | | |
| | 8 | S-8 | | 33.5 | 1675 | 70 | 70 | 0.014 | 0 | ○ | 0.025 | ○ | 0.017 | ○ | 0.053 |
| | 9 | S-9 | | 33.4 | 1680 | 71 | 71 | 0.021 | 0 | ○ | 0.025 | X | 0.017 | ○ | 0.054 |
| | 10 | S-10 | | 33.6 | 1670 | 69 | 88 | 0.012 | 10 | ○ | 0.023 | ○ | 0.015 | | |
| | 11 | S-11 | | 33.5 | 1675 | 70 | 89 | 0.019 | 10 | ○ | 0.023 | X | 0.015 | | |
| | 12 | S-12 | Propylene glycol | 55.8 | 1005 | 72 | 72 | 0.004 | 0 | ○ | 0.009 | ○ | 0.006 | ○ | 0.019 |
| | 13 | S-13 | | 56.0 | 1002 | 70 | 70 | 0.008 | 0 | ○ | 0.009 | X | 0.006 | ○ | 0.019 |
| | 14 | S-14 | | 56.0 | 1002 | 70 | 93 | 0.003 | 30 | ○ | 0.006 | ○ | 0.004 | | |
| | 15 | S-15 | | 56.1 | 1000 | 68 | 94 | 0.005 | 30 | ○ | 0.006 | X | 0.004 | | |
| | 16 | S-16 | Pentaerythritol | 37.5 | 1496 | 71 | 83 | 0.010 | 8 | ○ | 0.019 | ○ | 0.012 | | |
| | 17 | S-17 | | 37.3 | 1504 | 70 | 82 | 0.018 | 8 | ○ | 0.019 | X | 0.012 | | |
| | 18 | S-18 | | 28.0 | 2004 | 71 | 89 | 0.012 | 8 | ○ | 0.033 | ○ | 0.022 | | |
| | 19 | S-19 | | 28.2 | 1989 | 71 | 87 | 0.025 | 8 | ○ | 0.033 | X | 0.022 | | |

*Primary hydroxyl group ratio: (1) Primary hydroxyl group ratio in structure represented by the chemical formula (12) (before the addition of EO) (2) Primary hydroxyl group ratio of polyol The analytical results of the polyoxyalkylene polyols of Comparative Examples 1 to 24 were shown in Table 2. The verification results with respect to the above-mentioned mathematical expression (4) were also shown.

TABLE 2

| | | Polyol | Starting material | Hydroxyl value x | Hydroxyl group equivalent | Primary hydroxyl group ratio (2)* | Degree of unsaturation y | Content of EO z | Right-hand side of mathematical expression 1 | | Right-hand side of mathematical expression 3 | | Right-hand side of mathematical expression 4 | |
|---|---|---|---|---|---|---|---|---|---|---|---|---|---|---|
| Comparative Examples | 1 | n-1 | Glycerin | 56.1 | 1000 | 70 | 0.016 | 0 | X | 0.009 | X | 0.006 | ○ | 0.019 |
| | 2 | n-2 | | 56.3 | 996 | 69 | 0.030 | 0 | X | 0.009 | X | 0.006 | X | 0.019 |
| | 3 | n-3 | | 56.0 | 1002 | 2 | 0.051 | 0 | X | 0.009 | X | 0.006 | X | 0.019 |
| | 4 | n-4 | | 56.1 | 1000 | 71 | 0.015 | 4 | X | 0.009 | X | 0.006 | ○ | 0.019 |
| | 5 | n-5 | | 56.1 | 1000 | 71 | 0.029 | 4 | X | 0.009 | X | 0.006 | X | 0.019 |
| | 6 | n-6 | | 55.9 | 1004 | 48 | 0.047 | 7 | X | 0.008 | X | 0.006 | X | 0.019 |
| | 7 | n-7 | | 33.7 | 1665 | 70 | 0.040 | 0 | X | 0.025 | X | 0.017 | ○ | 0.053 |
| | 8 | n-8 | | 33.5 | 1675 | 69 | 0.065 | 0 | X | 0.025 | X | 0.017 | X | 0.053 |
| | 9 | n-9 | | 33.5 | 1675 | 2 | 0.075 | 0 | X | 0.025 | X | 0.017 | X | 0.053 |
| | 10 | n-10 | | 33.5 | 1675 | 89 | 0.026 | 10 | X | 0.023 | X | 0.015 | | |
| | 11 | n-11 | | 33.2 | 1690 | 90 | 0.040 | 10 | X | 0.023 | X | 0.015 | | |
| | 12 | n-12 | | 33.4 | 1680 | 92 | 0.053 | 30 | X | 0.018 | X | 0.012 | | |
| | 13 | n-13 | Propylene glycol | 56.1 | 1000 | 70 | 0.014 | 0 | X | 0.009 | X | 0.006 | ○ | 0.019 |
| | 14 | n-14 | | 55.9 | 1004 | 71 | 0.031 | 0 | X | 0.009 | X | 0.006 | X | 0.019 |
| | 15 | n-15 | | 56.3 | 996 | 2 | 0.048 | 0 | X | 0.009 | X | 0.006 | X | 0.019 |
| | 16 | n-16 | | 56.1 | 1000 | 89 | 0.009 | 30 | X | 0.006 | X | 0.004 | | |
| | 17 | n-17 | | 56.0 | 1002 | 90 | 0.019 | 30 | X | 0.006 | X | 0.004 | | |
| | 18 | n-18 | | 56.2 | 998 | 82 | 0.032 | 30 | X | 0.006 | X | 0.004 | | |
| | 19 | n-19 | Pentaerythritol | 37.3 | 1504 | 87 | 0.022 | 8 | X | 0.019 | X | 0.012 | | |
| | 20 | n-20 | | 37.3 | 1504 | 86 | 0.042 | 8 | X | 0.019 | X | 0.012 | | |
| | 21 | n-21 | | 37.4 | 1500 | 81 | 0.059 | 17 | X | 0.017 | X | 0.011 | | |
| | 22 | n-22 | | 33.7 | 1665 | 89 | 0.027 | 8 | X | 0.023 | X | 0.015 | | |

TABLE 2-continued

| | | Properties of polyol | | | | | Whether polyol satisfies mathematical expression or not | | | | |
|---|---|---|---|---|---|---|---|---|---|---|---|
| | | | | Primary | | | | | | | |
| Polyol | Starting material | Hydroxyl value x | Hydroxyl group equivalent | hydroxyl group ratio (2)* | Degree of unsaturation y | Content of EO z | Right-hand side of mathematical expression 1 | | Right-hand side of mathematical expression 3 | | Right-hand side of mathematical expression 4 |
| 23 n-23 | | 33.7 | 1665 | 89 | 0.058 | 8 | X | 0.023 | X | 0.015 | |
| 24 n-24 | | 33.5 | 1675 | 83 | 0.071 | 14 | X | 0.022 | X | 0.014 | |

*Primary hydroxyl group ratio: (2) Primary hydroxyl group ratio of polyol

The measuring methods and units of hydroxyl value and total degree of unsaturation of the produced polyoxyalkylene polyols are shown below.

Hydroxyl value: measured in accordance with JIS K1557, unit is mgKOH/g

Total degree of unsaturation: measured in accordance with JIS K1557, unit is meq/g The hydroxyl group equivalent in Tables 1 and 2 is defined by the mathematical expression (5) shown below. Specifically, it is determined by 56100/hydroxyl value x after measuring the hydroxyl value x.

(Hydroxyl group equivalent)=(number average molecular weight)/(average number of hydroxyl group)   (5)

In the examples and comparative examples of Tables 1 and 2, those in which the EO content z is 0 were shown in FIG. 1 as a graph. The axes, symbols and curves of the graph described in FIG. 1 will be described below.

X-axis: hydroxyl value x of polyoxyalkylene polyol or monool

Y-axis: total degree of unsaturation y of polyoxyalkylene polyol or monool

Symbol "O" denotes a polyoxyalkylene polyol described in the examples of the present invention, which contains no EO at the terminal.

Symbol "x" denotes a polyoxyalkylene polyol described in the comparative examples of the present invention, which contains no EO at the terminal.

Curve 1 shows the mathematical expression 1 of the present invention.

Curve 2 shows the mathematical expression 3 of the present invention.

Curve 3 shows the inequality expression 1 (mathematical expression 4') described in Patent Document 4 (Japanese Patent No. 3688667) with respect to the polyoxyalkylene polyol of the prior art.

Example 20

In a 2500 ml four-necked flask equipped with a stirrer and a temperature control device, 162 g of 4,4'-diphenylmethane diisocyanate (trade name: MILLIONATE MT, manufactured by Nippon Polyurethane Industry Co., Ltd.), 412 g of the polyoxyalkylene polyol (S-12) (molecular weight of 2000) obtained in Example 12, 26 g of ethylene glycol and 1390 g of dimethylformamide were charged and then reacted at 70° C. until a reaction rate (consumption rate) of isocyanate reached 100%. The obtained polyurethane resin solution was spread on a glass plate and then heated under −0.1 MPa at 60° C. for 6 hours to obtain a urethane resin. The reaction rate of an isocyanate group during the reaction was 60% after 2 hours, 89% after 6 hours, and 100% after 8 hours.

Example 21

In the same manner as in Example 20, except that the polyoxyalkylene polyol (S-13) was used in place of the polyoxyalkylene polyol (S-12), a urethane resin was synthesized. The reaction rate of an isocyanate group during the reaction was 59% after 2 hours, 90% after 6 hours, and 100% after 8 hours.

Comparative Example 25

In the same manner as in Example 20, except that the polyoxyalkylene polyol (n-13) was used in place of the polyoxyalkylene polyol (S-12), a urethane resin was synthesized. The reaction rate of an isocyanate group during the reaction was 60% after 2 hours, 88% after 4 hours, and 100% after 8 hours.

Comparative Example 26

In the same manner as in Example 20, except that the polyoxyalkylene polyol (n-14) was used in place of the polyoxyalkylene polyol (S-12), a urethane resin was synthesized. The reaction rate of an isocyanate group during the reaction was 60% after 2 hours, 88% after 4 hours, and 100% after 8 hours.

Comparative Example 27

In the same manner as in Example 20, except that the polyoxyalkylene polyol (n-15) was used in place of the polyoxyalkylene polyol (S-12), a urethane resin was synthesized. The reaction rate of an isocyanate group during the reaction was 30% after 2 hours, 60% after 4 hours, 86% after 8 hours, 96% after 16 hours, and 100% after 24 hours.

The physical property values of the polyurethane elastomers obtained in Examples 20 and 21 as well as Comparative Example 25 to 27 are shown in Table 3.

TABLE 3

| | | Examples | | Comparative Examples | | |
|---|---|---|---|---|---|---|
| | | 20 | 21 | 25 | 26 | 27 |
| | Polyol used | S-12 | S-13 | n-13 | n-14 | n-15 |
| Physical properties of resin | Tensile strength at break | 305 | 300 | 290 | 270 | 210 |
| | Elongation at break | 895 | 890 | 885 | 875 | 870 |
| | 100% modulus | 39 | 38 | 37 | 35 | 32 |

In Table 3, it became apparent that the urethane elastomers of Examples 20 and 21 of the present invention exhibit improved mechanical strength (particularly elongation at break, tensile strength at break) as compared with the urethane elastomers of Comparative Examples 25 to 27 obtained by the prior art.

Particularly, even when compared with the urethane elastomer (Comparative Example 25) obtained by using the polyoxyalkylene polyol of the prior art, which satisfies the inequality expression 1 (mathematical expression 4') described in Japanese Patent No. 3688667, the urethane elastomer obtained by the present invention has improved mechanical strength.

Example 22

In the same manner as in Example 20, except that the polyoxyalkylene polyol (S-14) was used in place of the polyoxyalkylene polyol (S-12), a urethane resin was synthesized. The reaction rate of an isocyanate group during the reaction was 69% after 2 hours, 94% after 6 hours, and 100% after 8 hours.

Example 23

In the same manner as in Example 20, except that the polyoxyalkylene polyol (S-15) was used in place of the polyoxyalkylene polyol (S-12), a urethane resin was synthesized. The reaction rate of an isocyanate group during the reaction was 71% after 2 hours, 95% after 6 hours, and 100% after 8 hours.

Comparative Example 28

In the same manner as in Example 20, except that the polyoxyalkylene polyol (S-16) was used in place of the polyoxyalkylene polyol (S-12), a urethane resin was synthesized. The reaction rate of an isocyanate group during the reaction was 70% after 2 hours, 94% after 4 hours, and 100% after 8 hours.

Comparative Example 29

In the same manner as in Example 20, except that the polyoxyalkylene polyol (n-17) was used in place of the polyoxyalkylene polyol (S-12), a urethane resin was synthesized. The reaction rate of an isocyanate group during the reaction was 73% after 2 hours, 93% after 4 hours, and 100% after 8 hours.

Comparative Example 30

In the same manner as in Example 20, except that the polyoxyalkylene polyol (n-18) was used in place of the polyoxyalkylene polyol (S-12), a urethane resin was synthesized. The reaction rate of an isocyanate group during the reaction was 64% after 2 hours, 90% after 4 hours, and 100% after 8 hours.

The physical property values of the polyurethane elastomers obtained in Examples 22 and 23 as well as Comparative Example 28 to 30 are shown in Table 4.

TABLE 4

|  |  | Examples | | Comparative Examples | | |
| --- | --- | --- | --- | --- | --- | --- |
|  |  | 22 | 23 | 28 | 29 | 30 |
|  | Polyol used | S-14 | S-15 | n-16 | n-17 | n-18 |
| Physical properties of resin | Tensile strength at break | 370 | 365 | 360 | 335 | 280 |
|  | Elongation at break | 905 | 905 | 890 | 880 | 875 |
|  | 100% modulus | 40 | 39 | 38 | 36 | 33 |

In Table 4, it became apparent that the urethane elastomers of Examples 22 and 23 of the present invention exhibit improved mechanical strength (particularly elongation at break, tensile strength at break) as compared with the urethane elastomers of Comparative Examples 28 to 30 obtained by the prior art.

Particularly, even when, compared with the urethane elastomer (Comparative Example 28) obtained by using the polyoxyalkylene polyol of the prior art, which satisfies the inequality expression 1 (mathematical expression 4') described in Japanese Patent No. 3688667, the urethane elastomer obtained by the present invention has improved mechanical strength.

Example 24

In the same manner as in Example 20, except that 690 g of the polyoxyalkylene polyol (S-8) was used in place of the polyoxyalkylene polyol (S-12), a urethane resin was synthesized. The reaction rate of an isocyanate group during the reaction was 69% after 2 hours, 94% after 6 hours, and 100% after 8 hours.

Example 25

In the same manner as in Example 20, except that 690 g of the polyoxyalkylene polyol (S-9) was used in place of the polyoxyalkylene polyol (S-12), a urethane resin was synthesized. The reaction rate of an isocyanate group during the reaction was 71% after 2 hours, 94% after 6 hours, and 100% after 8 hours.

Comparative Example 31

In the same manner as in Example 20, except that 690 g of the polyoxyalkylene polyol (n-7) was used in place of the polyoxyalkylene polyol (S-12), a urethane resin was synthesized. The reaction rate of an isocyanate group during the reaction was 70% after 2 hours, 95% after 4 hours, and 100% after 8 hours.

Comparative Example 32

In the same manner as in Example 20, except that 690 g of the polyoxyalkylene polyol (n-8) was used in place of the polyoxyalkylene polyol (S-12), a urethane resin was synthesized. The reaction rate of an isocyanate group during the reaction was 73% after 2 hours, 93% after 4 hours, and 100% after 8 hours.

Comparative Example 33

In the same manner as in Example 20, except that 690 g of the polyoxyalkylene polyol (n-9) was used in place of the polyoxyalkylene polyol (S-12), a urethane resin was synthesized. The reaction rate of an isocyanate group during the reaction was 28% after 2 hours, 59% after 4 hours, 87% after 8 hours, 95% after 16 hours, and 100% after 24 hours.

The physical property values of the polyurethane elastomers obtained in Examples 24 and 25 as well as Comparative Example 31 to 33 are shown in Table 5.

TABLE 5

|  |  | Examples | | Comparative Examples | | |
|---|---|---|---|---|---|---|
|  |  | 24 | 25 | 31 | 32 | 33 |
|  | Polyol used | S-8 | S-9 | n-7 | n-8 | n-9 |
| Physical properties of resin | Tensile strength at break | 550 | 540 | 535 | 480 | 410 |
|  | Elongation at break | 330 | 325 | 315 | 310 | 290 |
|  | 100% modulus | 52 | 53 | 51 | 45 | 38 |

In Table 5, it became apparent that the urethane elastomers of Examples 24 and 25 of the present invention exhibit improved mechanical strength (particularly elongation at break, tensile strength at break) as compared with the urethane elastomers of Comparative Examples 31 to 33 obtained by the prior art.

Particularly, even when compared with the urethane elastomer (Comparative Example 31) obtained by using the polyoxyalkylene polyol of the prior art, which satisfies the inequality expression 1 (mathematical expression 4') described in Japanese Patent No. 3688667, the urethane elastomer obtained by the present invention has improved mechanical strength.

The measuring methods and units of physical properties of the polyurethane elastomer are shown below.

Tensile strength at break: measured in accordance with JIS K6251, unit is kgf/cm$^2$ Elongation at break: measured in accordance with JIS K6251, unit is %

100% modulus: measured in accordance with JIS K6251, unit is kgf/cm$^2$

Examples 26 to 32, Comparative Examples 34 to 39

According to the foaming formulations shown in Tables 6 and 7, polyurethane slab foams were expanded under the foaming conditions shown below and then left stand whole day and night. Thereafter, various physical properties of the polyurethane slab foams were measured. The measured values of physical properties were also shown in Tables 6 and 7, respectively.

(Foaming Conditions)
BOX SIZE: top-opened box measuring 30 cm×30 cm×30 cm
Material: lumber
Mixing method: hand mixing Raw materials of the polyurethane slab foams in examples and comparative examples are as follows.

1. Urethanation Catalyst (c)
(1) Urethanation catalyst (c-1): "Neostan U-28" (stannous octoate), manufactured by Nitto Kasei Co., Ltd.
(2) Urethanation catalyst (c-2): "TOYOCAT ET", manufactured by TOSOH CORPORATION (70 wt % solution of bis(dimethylaminoethyl)ether in dipropylene glycol)
(3) Urethanation catalyst (c-3): "DABCO-33LV", manufactured by Air Products Japan Inc. (33 wt % solution of triethylenediamine in dipropylene glycol)

2. Blowing Agent (d)
(1) Blowing agent (d-1): water
(2) Blowing agent (d-2): methylene chloride 3. Foam Stabilizer (e)
(1) Foam stabilizer (e-1): "L-540", manufactured by Dow Corning Toray Co., Ltd.

4. Isocyanate
TDI: "Coronate T-80" (tolylene diisocyanate), manufactured by Nippon Polyurethane Industry Co., Ltd.

TABLE 6

|  |  |  | Examples | | | | | Comparative Examples | | |
|---|---|---|---|---|---|---|---|---|---|---|
|  |  |  | 26 | 27 | 28 | 29 | 30 | 34 | 35 | 36 |
| <Blending formulation> (parts by weight) | Polyol | S-1 | 100 |  |  |  |  |  |  |  |
|  |  | S-2 |  | 100 |  |  |  |  |  |  |
|  |  | S-3 |  |  | 100 |  |  |  |  |  |
|  |  | S-4 |  |  |  | 100 |  |  |  |  |
|  |  | S-5 |  |  |  |  | 100 |  |  |  |
|  |  | n-1 |  |  |  |  |  | 100 |  |  |
|  |  | n-2 |  |  |  |  |  |  | 100 |  |
|  |  | n-3 |  |  |  |  |  |  |  | 100 |
|  | Catalyst | c-1 | 0.22 | 0.22 | 0.22 | 0.22 | 0.22 | 0.36 | 0.36 | 0.36 |
|  |  | c-2 | 0.15 | 0.15 | 0.15 | 0.15 | 0.15 |  |  |  |
|  |  | c-3 |  |  |  |  |  | 0.30 | 0.30 | 0.30 |
|  | Blowing agent | d-1 | 4.5 | 4.5 | 4.5 | 4.5 | 4.5 | 4.5 | 4.5 | 4.5 |
|  | Foam stabilizer | e-1 | 1.0 | 1.0 | 1.0 | 1.0 | 1.0 | 1.0 | 1.0 | 1.0 |
|  | TDI (NCO Index) |  | 105 | 105 | 105 | 105 | 105 | 105 | 105 | 105 |
| Physical properties of foam | Core density |  | 23.0 | 22.7 | 23.2 | 23.1 | 22.9 | 22.9 | 22.6 | 22.8 |
|  | Hardness (25% ILD) |  | 14.3 | 14.2 | 14.2 | 14.3 | 14.1 | 13.7 | 13.5 | 13.0 |
|  | Tensile strength |  | 0.83 | 0.81 | 0.81 | 0.82 | 0.81 | 0.78 | 0.76 | 0.75 |
|  | Tear strength |  | 0.57 | 0.58 | 0.56 | 0.57 | 0.56 | 0.55 | 0.53 | 0.52 |
|  | Elongation |  | 147 | 148 | 146 | 147 | 145 | 138 | 137 | 135 |
|  | Residual compression strain ratio |  | 2.3 | 2.2 | 2.3 | 2.3 | 2.4 | 2.6 | 2.7 | 3.2 |

TABLE 6-continued

|  |  | Examples | | | | | Comparative Examples | | |
| --- | --- | --- | --- | --- | --- | --- | --- | --- | --- |
|  |  | 26 | 27 | 28 | 29 | 30 | 34 | 35 | 36 |
| Moist heat residual compression strain ratio | | 6.1 | 6.2 | 6.2 | 6.1 | 6.3 | 6.5 | 6.7 | 12.3 |

TABLE 7

|  |  |  | Examples | | Comparative Examples | | |
| --- | --- | --- | --- | --- | --- | --- | --- |
|  |  |  | 31 | 32 | 37 | 38 | 39 |
| <Blending formulation> (parts by weight) | Polyol | S-6 | 100 | | | | |
|  |  | S-7 | | 100 | | | |
|  |  | n-4 | | | 100 | | |
|  |  | n-5 | | | | 100 | |
|  |  | n-6 | | | | | 100 |
|  | Catalyst | c-1 | 0.30 | 0.30 | 0.30 | 0.30 | 0.50 |
|  |  | c-2 | 0.15 | 0.15 | 0.15 | 0.15 | |
|  |  | c-3 | | | | | 0.30 |
|  | Blowing agent | d-1 | 4.5 | 4.5 | 4.5 | 4.5 | 4.5 |
|  |  | d-2 | 13.0 | 13.0 | 13.0 | 13.0 | 14.0 |
|  | Foam stabilizer | e-1 | 1.0 | 1.0 | 1.0 | 1.0 | 1.0 |
|  | TDI (NCO Index) | | 105 | 105 | 105 | 105 | 105 |
| Physical properties of foam | Core density | | 18.0 | 18.3 | 18.1 | 18.0 | 18.2 |
|  | Hardness (25% ILD) | | 11.0 | 10.7 | 10.3 | 10.1 | 9.4 |
|  | Tensile strength | | 0.64 | 0.61 | 0.59 | 0.58 | 0.56 |
|  | Tear strength | | 0.41 | 0.40 | 0.40 | 0.39 | 0.37 |
|  | Elongation | | 158 | 157 | 144 | 142 | 143 |
|  | Residual compression strain ratio | | 3.6 | 3.7 | 3.8 | 3.9 | 4.3 |
|  | Moist heat residual compression strain ratio | | 10.1 | 10.6 | 11.5 | 12.2 | 13.6 |

The measuring methods and units of physical properties of the foam are shown below.

Core density: measured in accordance with JIS K6400, unit is kg/m$^3$

Hardness (25%-ILD): measured in accordance with JIS K6400, unit is N/314 cm$^2$

Tensile strength: measured in accordance with JIS K6400, unit is kgf/cm$^2$

Elongation: measured in accordance with JIS K6400, unit is %

Tear strength: measured in accordance with JIS K6400, unit is kgf/cm

Residual compression strain ratio: measured in accordance with JIS K6400, unit is %

Moist heat residual compression strain ratio: measured in accordance with JIS K6400, unit is %

In Table 6, the urethane foams of Examples 26 to 30 of the present invention exhibit improved physical properties of the foam, particularly hardness and moist heat residual compression strain ratio of the foam as compared with the urethane foams of Comparative Examples 34 to 36 obtained by the prior art.

Particularly, even when compared with the urethane foam (Comparative Example 34) obtained by using the polyoxyalkylene polyol of the prior art, which satisfies the inequality expression 1 (mathematical expression 4') described in Japanese Patent No. 3688667, the urethane foam obtained by the present invention has improved physical properties of the foam.

Also in Table 7, the urethane foams of Examples 31 and 32 of the present invention exhibit improved physical properties of the foam, particularly hardness and moist heat residual compression strain ratio of the foam as compared with the urethane foams of Comparative Examples 37 to 39 obtained by the prior art.

Particularly, even when compared with the urethane foam (Comparative Example 37) obtained by using the polyoxyalkylene polyol of the prior art, which satisfies the inequality expression 1 (mathematical expression 4') described in Japanese Patent No. 3688667, the urethane foam obtained by the present invention has improved physical properties of the foam.

Examples 33 to 36, Comparative Examples 40 to 45

According to the foaming formulations shown in Tables 8 and 9, soft polyurethane foams were expanded in a mold under the forming conditions shown below to form foams, which were taken out from the mold and then left stand whole day and night. Thereafter, various physical properties of the soft polyurethane foams were measured. The measured-values of physical properties are also shown in Tables 8 and 9, respectively.

(Foaming Conditions)
 Mold SIZE: 40 cm×40 cm×10 cm (height)
 Mold temperature: 65° C.
 Material of mold: aluminum
 Mixing method: high-pressure urethane foaming machine (manufactured by Polymer Engineering Co., Ltd.)
 A polyol premix is mixed with isocyanate under 15 MPa.
 Those shown in the examples and comparative examples of the polyurethane slab foam were used as raw materials of the soft polyurethane foams in Examples 33 to 36 and Comparative Examples 40 to 45, and others are as follows.
3. Foam Stabilizer (e)
(2) Foam stabilizer (e-2): "SZ-1346", manufactured by Dow Corning Toray Co., Ltd.
4. Isocyanate
 "CE-729" (TDI-80 (ratio of 2,4- and 2,6-TDI, 2,4-isomer is 80%/crude MDI (average functional group number: 2.9) =80/20 (weight ratio)), manufactured by Nippon Polyurethane Industry Co., Ltd.
5. Polyol (p)
(1) Polyol (p-1): polyoxyethylene polyoxypropylene polyol having an average functional group number of 3.0, a hydroxyl value of 34, and a total of EO units of 20%, which was obtained by block addition of glycerin with PO and EO
(2) Polymerpolyol (p-2): polymerpolyol (polymer content: 30%) having a hydroxyl value of 24 in which styrene and acrylonitrile (weight ratio: 30/70) were copolymerized in polyoxyethylene polyoxypropylene polyol having an average functional group number of 3.0, a hydroxyl value of 34, and a total of EO units of 14%, which was obtained by block addition of glycerin with PO and EO
(3) Polyol (p-3): polyoxyethylene polyoxypropylene polyol having an average functional group number of 3.0, a hydroxyl value of 24, a total of EO units of 72%, which was obtained by random addition of glycerin with PO and EO
(4) Polyol (p-4): polyoxypropylene polyol having an average functional group number of 6.0 and a hydroxyl value of 1250, which was obtained by addition of sorbitol with PO
(5) Polyol (p-5): triethanolamine
(6) Polyol (p-6): polyoxyethylene polyoxypropylene polyol having an average functional group number of 3.0, a hydroxyl value of 28, and a total of EO units of 16%, which was obtained by block addition of glycerin with PO and EO
(7) Polyol (p-7): ethylene glycol

TABLE 8

|  |  |  | Examples | | Comparative Examples | | |
|---|---|---|---|---|---|---|---|
|  |  |  | 33 | 34 | 40 | 41 | 42 |
| <Blending formulation> (parts by weight) | Polyol | S-16 | 20 |  |  |  |  |
|  |  | S-17 |  | 20 |  |  |  |
|  |  | n-19 |  |  | 20 |  |  |
|  |  | n-20 |  |  |  | 20 |  |
|  |  | n-21 |  |  |  |  | 20 |
|  |  | p-1 | 35 | 35 | 35 | 35 | 35 |
|  |  | p-2 | 45 | 45 | 45 | 45 | 45 |
|  |  | p-3 | 1 | 1 | 1 | 1 | 1 |
|  |  | p-4 | 2 | 2 | 2 | 2 | 2 |
|  |  | p-5 | 2 | 2 | 2 | 2 | 2 |
|  | Catalyst | c-2 | 0.10 | 0.10 | 0.10 | 0.10 | 0.10 |
|  |  | c-3 | 0.45 | 0.45 | 0.45 | 0.45 | 0.45 |
|  | Blowing agent | d-1 | 3.8 | 3.8 | 3.8 | 3.8 | 3.8 |
|  | Foam stabilizer | e-2 | 1.2 | 1.2 | 1.2 | 1.2 | 1.2 |
|  | NCO Index |  | 100 | 100 | 100 | 100 | 100 |
| Physical properties of foam | Core density |  | 36.7 | 36.5 | 36.6 | 36.8 | 36.7 |
|  | Hardness (25% ILD) |  | 20.8 | 20.4 | 20.1 | 19.9 | 19.4 |
|  | Impact resilience |  | 68 | 67 | 66 | 65 | 64 |
|  | Tensile strength |  | 1.59 | 1.56 | 1.54 | 1.53 | 1.51 |
|  | Tear strength |  | 0.63 | 0.62 | 0.62 | 0.61 | 0.59 |
|  | Elongation |  | 106 | 104 | 102 | 100 | 101 |
|  | Residual compression strain ratio |  | 4.3 | 4.4 | 4.5 | 4.6 | 6.0 |
|  | Moist heat residual compression strain ratio |  | 17.3 | 18.1 | 18.6 | 18.8 | 20.2 |

TABLE 9

|  |  |  | Examples | | Comparative Examples | | |
|---|---|---|---|---|---|---|---|
|  |  |  | 35 | 36 | 43 | 44 | 45 |
| <Blending formulation> (parts by weight) | Polyol | S-16 | 28 |  |  |  |  |
|  |  | S-17 |  | 28 |  |  |  |
|  |  | n-19 |  |  | 28 |  |  |
|  |  | n-20 |  |  |  | 28 |  |
|  |  | n-21 |  |  |  |  | 28 |
|  |  | p-2 | 30 | 30 | 30 | 30 | 30 |
|  |  | p-3 | 0.5 | 0.5 | 0.5 | 0.5 | 0.5 |

TABLE 9-continued

|  |  |  | Examples | | Comparative Examples | | |
| --- | --- | --- | --- | --- | --- | --- | --- |
|  |  |  | 35 | 36 | 43 | 44 | 45 |
|  |  | p-5 | 2 | 2 | 2 | 2 | 2 |
|  |  | p-6 | 42 | 42 | 42 | 42 | 42 |
|  |  | p-7 | 1 | 1 | 1 | 1 | 1 |
|  | Catalyst | c-2 | 0.07 | 0.07 | 0.07 | 0.07 | 0.07 |
|  |  | c-3 | 0.40 | 0.40 | 0.40 | 0.40 | 0.40 |
|  | Blowing agent | d-1 | 3.8 | 3.8 | 3.8 | 3.8 | 3.8 |
|  | Foam stabilizer | e-2 | 1.0 | 1.0 | 1.0 | 1.0 | 1.0 |
|  | NCO Index |  | 100 | 100 | 100 | 100 | 100 |
| Physical properties of foam | Core density |  | 42.3 | 42.0 | 42.1 | 42.5 | 42.3 |
|  | Hardness (25% ILD) |  | 21.2 | 20.8 | 20.7 | 20.5 | 20.3 |
|  | Impact resilience |  | 73 | 72 | 72 | 71 | 70 |
|  | Tensile strength |  | 1.49 | 1.47 | 1.45 | 1.43 | 1.40 |
|  | Tear strength |  | 0.57 | 0.54 | 0.53 | 0.51 | 0.49 |
|  | Elongation |  | 110 | 108 | 101 | 100 | 102 |
|  | Residual compression strain ratio |  | 4.3 | 4.4 | 4.5 | 4.8 | 6.2 |
|  | Moist heat residual compression strain ratio |  | 12.2 | 13.1 | 13.3 | 13.6 | 14.8 |

The measuring methods and units of physical properties of the foam are shown below.

Core density: measured in accordance with JIS K6400, unit is kg/m$^3$

Hardness (25%-ILD): measured in accordance with JIS K6400, unit is N/314 cm$^2$

Tensile strength: measured in accordance with JIS K6400, unit is kgf/cm$^2$

Elongation: measured in accordance with JIS K6400, unit is %

Tear strength: measured in accordance with JIS K6400, unit is kgf/cm

Impact resilience: measured in accordance with JIS K6400, unit is %

Residual compression strain ratio: measured in accordance with JIS K6400, unit is %

Moist heat residual compression strain ratio: measured in accordance with JIS K6400, unit is %

In Table 8, the urethane foams of Examples 33 and 34 of the present invention exhibit improved physical properties of the foam, particularly hardness and moist heat residual compression strain ratio of the foam as compared with the urethane foams of Comparative Examples 40 to 42 obtained by the prior art.

Particularly, even when compared with the urethane foam (Comparative Example 40) obtained by using the polyoxyalkylene polyol of the prior art, which satisfies the inequality expression 1 described in Japanese Patent No. 3688667, the urethane foam obtained by the present invention has improved physical properties of the foam.

Also in Table 9, the urethane foams of Examples 35 and 36 of the present invention exhibit improved physical properties of the foam, particularly hardness and moist heat residual compression strain ratio of the foam as compared with the urethane foams of Comparative Examples 43 to 45 obtained by the prior art.

Particularly, even when compared with the urethane foam (Comparative Example 43) obtained by using the polyoxyalkylene polyol of the prior art, which satisfies the inequality expression 1 described in Japanese Patent No. 3688667, the urethane foam obtained by the present invention has improved physical properties of the foam.

Examples 37 and 38, Comparative Examples 46 to 48

Production and Evaluation of Handle

Figure 7:
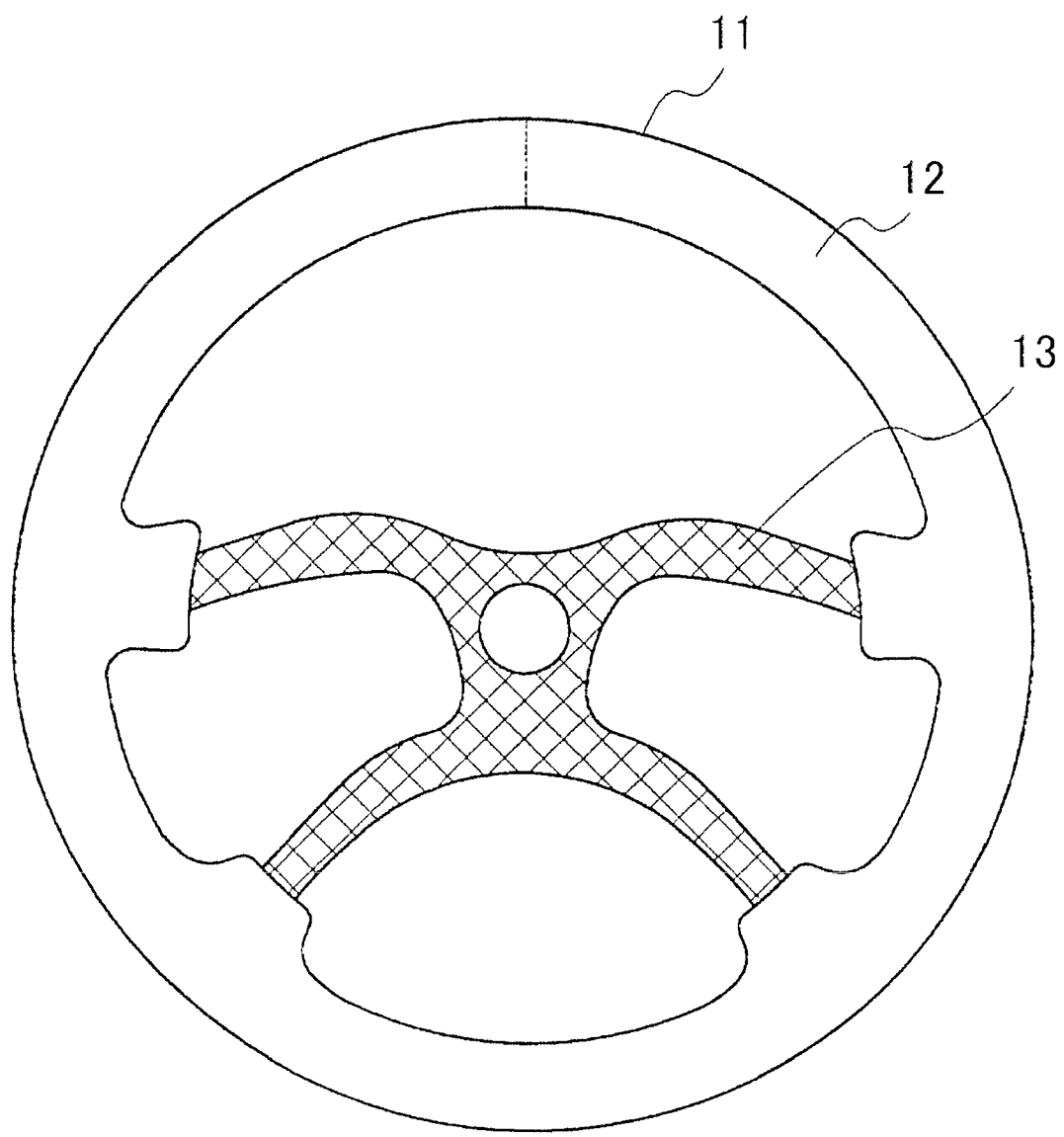
FIG. 7 is a view showing a handle of Example 37.
Figure 8:
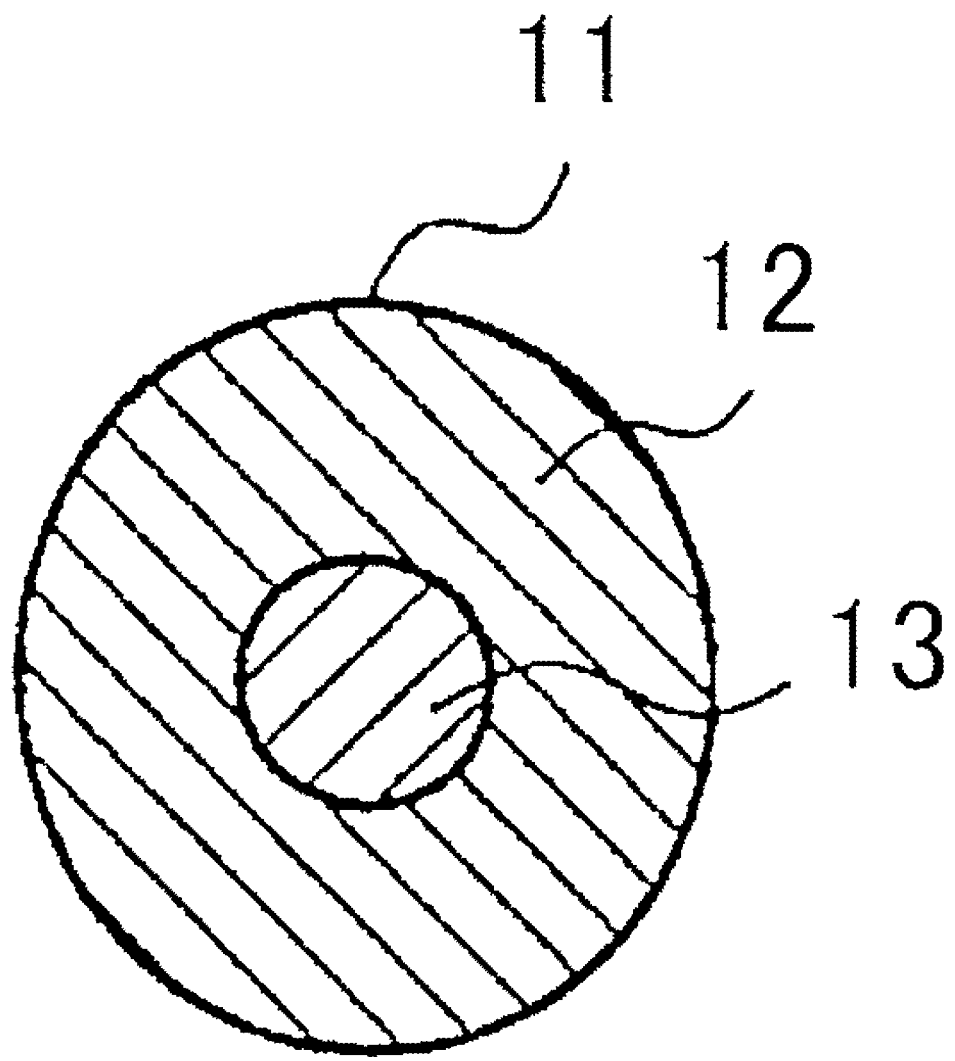
FIG. 8 is a view showing a cross section of the handle of Example 37.

According to the foaming formulation shown in Table 10, semi-rigid polyurethane foams having a density of 0.5 g/cm$^3$ were obtained under the foaming conditions shown below in a mold in which an iron core was set in advance. The evaluation results of the performance test are shown in Table 10. The entire view of a handle is shown in FIG. 7, and a sectional view at a broken portion in FIG. 7 is shown in FIG. 8.

(Foaming Conditions)

Mold inside dimension: inner diameter of 28 mm

Mold temperature: 40° C.

Material of mold: aluminum

Mixing method: high-pressure urethane foaming machine (manufactured by Polymer Engineering Co., Ltd.)

A polyol premix was mixed with isocyanate under 15 MPa.

Those shown in the above examples and comparative examples were used as raw materials of the semi-rigid polyurethane foams in Example 37 and 38 as well as Comparative Example 46 to 48, and others are as follows.

1. Urethanation Catalyst (c)

(4) Urethanation catalyst (c-4): "TOYOCAT ETF", manufactured by TOSOH CORPORATION 4. Isocyanate Organic polyisocyanate (MDI, NCO %=26.5) modified with polypropylene glycol (Mn=2000)

5. Polyol (8) Polymerpolyol (p-8): polymerpolyol (polymer content: 20%) having a hydroxyl value of 24 in which acrylonitrile was polymerized in a polyoxyethylene polyoxypropylene polyol having an average functional group number of 3.0, a hydroxyl value of 34, and a total of EO units of 14%, which was obtained by block addition of glycerin with PO and EO

TABLE 10

|  |  |  | Examples | | Comparative Examples | | |
|---|---|---|---|---|---|---|---|
|  |  |  | 37 | 38 | 46 | 47 | 48 |
| <Blending formulation> (parts by weight) | Polyol | S-8 | 85 |  |  |  |  |
|  |  | S-9 |  | 85 |  |  |  |
|  |  | n-7 |  |  | 85 |  |  |
|  |  | n-8 |  |  |  | 85 |  |
|  |  | n-9 |  |  |  |  | 85 |
|  |  | p-5 | 2 | 2 | 2 | 2 | 2 |
|  |  | p-7 | 8 | 8 | 8 | 8 | 8 |
|  |  | p-8 | 15 | 15 | 15 | 15 | 15 |
|  | Catalyst | c-2 | 0.1 | 0.1 | 0.1 | 0.1 | 0.1 |
|  |  | c-3 | 0.6 | 0.6 | 0.6 | 0.6 | 0.6 |
|  |  | c-4 | 0.1 | 0.1 | 0.1 | 0.1 | 0.1 |
|  | Blowing agent | d-1 | 0.35 | 0.35 | 0.35 | 0.35 | 0.35 |
|  | NCO Index |  | 56.5 | 56.5 | 56.5 | 56.5 | 56.5 |
| Performance test | <1> |  | 29 | 29 | 28 | 28 | 5 |
|  | <2> |  | 36 | 35 | 35 | 34 | 8 |
|  | <3> |  | 74 | 73 | 72 | 72 | — |
|  | <4> |  | 28.6 | 28.7 | 28.8 | 28.9 | Unmeasurable |
|  | <5> |  | 28.3 | 28.4 | 28.5 | 28.5 | Unmeasurable |
|  | Judgment of curability |  | O | O | O | O | X |
|  | Judgment of expansion upon demolding |  | O | O | O | O | Unmeasurable |

The measuring methods and units of physical properties of the handle are shown below.

<Test of Handle>

<1>: C hardness of foam when demolding is performed, 150 seconds after injection <2>: C hardness of foam when demolding is performed, 210 seconds after injection <3>: C hardness of foam, 1 day after molding <4>: Thickness (mm) of handle when demolding is performed, 150 seconds after injection <5>: Thickness (mm) of handle when demolding is performed, 210 seconds after injection The thickness of iron core of the portion where <1> to <5> were measured is 13 mm, and the inner dimension of the mold is 28 mm.

Judgment of curability: With respect to the foam molded when demolding was performed, 150 seconds after injection,
the case where the foam can retain shape of handle: 0
the case where the foam cannot retain shape of handle: x Judgment of expansion upon demolding:
With respect to the thickness of the handle molded when demolding was performed, 150 seconds after injection,
the thickness is less than 29 mm: O
the thickness is 29 mm or more: x In Table 10, the urethane foams of Examples 37 and 38 of the present invention exhibit improved both hardness and expansion properties of the foam as compared with the urethane foams of Comparative Examples 46 to 48 obtained by the prior art.

Particularly, even when compared with the urethane foam (Comparative Example 46) obtained by using the polyoxyalkylene polyol of the prior art, which satisfies the inequality expression 1 described in Japanese Patent No. 3688667, the urethane foam obtained by the present invention has improved physical properties of the foam.

Examples 39 and 40, Comparative Examples 49 to 51

Production and Evaluation of Instrument Panel

Figure 9:
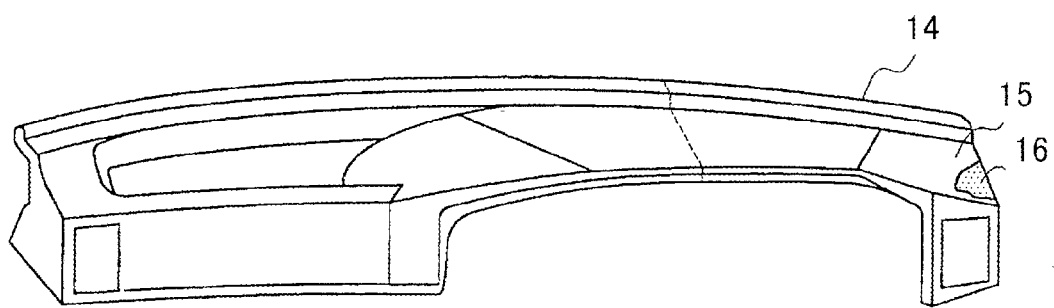
FIG. 9 is a view showing an instrument panel of Example 39.
Figure 10:
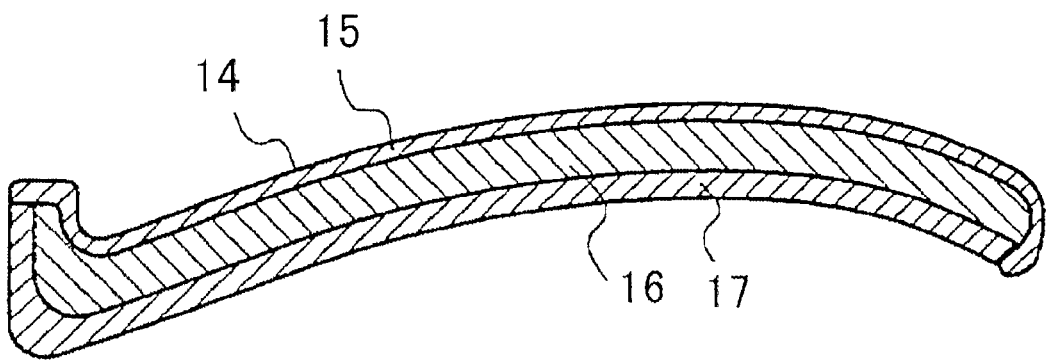
FIG. 10 is a view showing a cross section of the instrument panel of Example 39.

According to the foaming formulation shown in Table 11, semi-rigid polyurethane foams having a density of 0.16 g/cm³ were obtained under the foaming conditions shown below in a mold in which a skin material and a core material were set in advance. The evaluation results of the performance test are shown in Table 11. The entire view of an instrument panel is shown in FIG. 9, and a sectional view at a broken portion in FIG. 9 is shown in FIG. 10.

(Foaming Conditions)
Mold temperature: 45° C.
Material of mold: aluminum
Mixing method: high-pressure urethane foaming machine (manufactured by Polymer Engineering Co., Ltd.)
A polyol premix is mixed with isocyanate under 15 MPa.

Those shown in the above examples and comparative examples were used as raw materials of the semi-rigid polyurethane foams in Example 39 and 40 as well as Comparative Example 49 to 51, and others are as follows.

1. Urethanation Catalyst (c)
(5) Urethanation catalyst (c-5): "U-CAT 1000" (N,N,N',N'-tetramethylethylenediamine), manufactured by San-Apro Ltd.

4. Isocyanate
Crude MDI: organic polyisocyanate (NCO %=31)

TABLE 11

|  |  |  | Examples | | Comparative Examples | | |
|---|---|---|---|---|---|---|---|
|  |  |  | 39 | 40 | 49 | 50 | 51 |
| <Blending formulation> (parts by weight) | Polyol | S-10 | 100 |  |  |  |  |
|  |  | S-11 |  | 100 |  |  |  |
|  |  | n-10 |  |  | 100 |  |  |
|  |  | n-11 |  |  |  | 100 |  |
|  |  | n-12 |  |  |  |  | 100 |
|  |  | p-5 | 0.5 | 0.5 | 0.5 | 0.5 | 0.5 |
|  | Catalyst | c-3 | 0.2 | 0.2 | 0.2 | 0.2 | 0.2 |
|  |  | c-5 | 0.8 | 0.8 | 0.8 | 0.8 | 0.8 |
|  | Blowing agent | d-1 | 2.5 | 2.5 | 2.5 | 2.5 | 2.5 |
|  | NCO Index |  | 49.5 | 49.5 | 49.5 | 49.5 | 49.5 |
| Performance test | <6> |  | 29 | 28 | 28 | 27 | 22 |
|  | <7> |  | 62 | 61 | 60 | 60 | 60 |
|  | <8> |  | 14.9 | 14.8 | 14.7 | 14.5 | 13.5 |
|  | Judgment of curability |  | O | O | O | O | O |
|  | Judgment of shrinkage upon demolding |  | O | O | O | O | X |
|  | <9> |  | 5.6 | 5.2 | 5.0 | 4.9 | 4.8 |
|  | <10> |  | 4.0 | 3.7 | 3.5 | 3.3 | 3.1 |

The measuring methods and units of physical properties of the instrument panels are shown below.

<6>: C hardness on skin when demolding is performed, 120 seconds after injection <7>: C hardness on skin of foam, 1 day after molding <8>: Thickness (mm) of molded article when demolding is performed, 120 seconds after injection <9>: Tensile strength (kgf/cm²) of foam, 1 day after molding <10>: Tensile strength (kgf/cm²) of foam after a heat resistance test (110° C., 2000 hours)

The thickness of the skin of the portion where <6> to <8> were measured is 1 mm, the thickness of a core material was 5 mm and the inner dimension of a mold is 15 mm.

Judgment of Curability: With respect to the foam molded when demolding was performed, 120 seconds after injection,
the case where the foam can retain shape of instrument panel: O
the case where the foam cannot retain shape of instrument panel: x Judgment of shrinkage upon demolding:

With respect to the thickness of the instrument panel molded when demolding was performed, 120 seconds after injection, the thickness is 14 mm or more: O
the thickness is 14 mm or less: x (<9> and <10>: measured in accordance with JIS K-6301)

In Table 11, the urethane foams of Examples 39 and 40 of the present invention exhibit improved both hardness and durability of the foam as compared with the urethane foams of Comparative Examples 49 to 51 obtained by the prior art.

Particularly, even when compared with the urethane foam (Comparative Example 49) obtained by using the polyoxyalkylene polyol of the prior art, which satisfies the inequality expression 1 described in Japanese Patent No. 3688667, the urethane foam obtained by the present invention has improved physical properties of the foam.

INDUSTRIAL APPLICABILITY

The polyurethane resin obtained by using the polyoxyalkylene polyol (S) of the present invention can be used for various applications such as foams, elastomers, coating materials and the like. Examples of the foams include automotive cushioning materials, sound insulating and absorbing materials and the like, examples of the elastomers include casting and potting materials, and examples of the coating materials include adhesive materials, coating materials and the like. The polyoxyalkylene polyol or monool (S) of the present invention is also useful as raw materials of surfactant compositions, such as oil solutions for treatment of fibers, detergents and defoamers.

The polyurethane elastomer and polyurethane foam obtained by using the polyoxyalkylene polyol (S) of the present invention are generally excellent in physical properties of the resin (tensile strength, hardness, curability, moisture resistance, durability) as compared with the case of using the polyoxyalkylene polyol obtained by the prior art.

Therefore, the polyurethane resin of the present invention can be widely used as adhesives, sealing materials, coating materials, heat insulating materials, synthetic lumbers and the like.

Among the foamed polyurethane resin of the present invention, the soft polyurethane foam is excellent in hardness, foam strength and durability as compared with a conventional foamed polyurethane resin. Therefore, the foamed polyurethane resin, particularly the soft polyurethane foam of the present invention can be widely used as cushioning materials, shock absorbing agents, buffers, sound insulating and absorbing materials and the like.

Among the foamed polyurethane resin of the present invention, the semi-rigid polyurethane foam is excellent in curability and also exhibits less expansion and shrinkage as well as large foam strength upon demolding as compared with a conventional semi-rigid polyurethane foam. Therefore, the foamed polyurethane resin, particularly the semi-rigid polyurethane foam of the present invention can be widely used as automotive interior materials (handle, instrument panel, sun visor, door trim, sheet, pillar, etc.), shock absorbing materials and buffers.

EXPLANATION OF REFERENCE SYMBOLS

1: Reaction vessel
2: Reaction column
3: Distillation column
4: Line under column
5: Raw material supply line
6: Circulation line
7: Circulation line
8: Circulation line
9: Adsorption column
10: Vacuum line
11: Handle
12: Urethane foam
13: Iron core
14: Instrument panel
15: Skin material
16: Urethane foam
17: Core material

The invention claimed is:

1. A polyoxyalkylene polyol or monool (S), which is an alkylene oxide adduct of an active hydrogen-containing compound (H), wherein 40% or more of hydroxyl groups located at the terminal are primary hydroxyl group-containing groups represented by formula (1);

wherein the polyoxyalkylene polyol or monool (S) is represented by formula (2);

wherein in the formula (1), $R^1$ represents a hydrogen atom, an alkyl group having 1 to 10 carbon atoms, a cycloalkyl group or a phenyl group, and these groups are unsubstituted or substituted with a halogen atom or an aryl group,

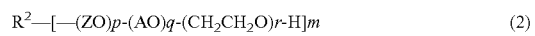

wherein in the formula (2), $R^2$ represents an m-valent group in which m active hydrogens are removed from the active hydrogen-containing compound (H); Z is a group represented by the formula (3) or (4) shown below; A is a group represented by the formula (5) or (6) shown below in which 40% or more of the structure of A located at the terminal among the moiety of (AO)q in the formula (2) is a structure represented by the formula (6) and, when a plurality of Zs or As are present, each be the same or different; m is 1 (when (S) is a monool) or an integer of 2 to 100 (when (S) is a polyol); p is 0 or an integer of 1 to 200; q is an integer of 1 to 200; and r is 0 or an integer of 1 to 200,

[Chemical Formula 5]

wherein in the formulas (3) and (4), $R^3$ is a hydrogen atom, an alkyl group having 1 to 10 carbon atoms, a cycloalkyl group or a phenyl group and these groups are unsubstituted or substituted with a halogen atom or an aryl group and, in the formulas (5) and (6), $R^4$ is an alkyl group having 1 to 10 carbon atoms, a cycloalkyl group or a phenyl group and these groups are unsubstituted or substituted with a halogen atom or an aryl group, wherein a hydroxyl value x, the total degree of unsaturation y and the content of ethylene oxide z satisfy a relationship of the mathematical expression (3), $$y \leq 18.9 \times x^{-2} \times (100-z)/100 \quad (3)$$

in the mathematical expression (3), x represents 5 to 280 mgKOH/g, y represents the total degree of unsaturation represented by a unit meq/g, and z is the content (% by weight) of ethylene oxide based on the weight of (S) and is from 0 to 50, wherein the moiety of -(AO)q- in the formula (2) is obtained by ring-opening addition polymerization of an alkylene oxide having 3 to 12 carbon atoms in the presence of at least one catalyst (C) selected from the group consisting of a compound represented by the formula (7-1) shown below, a compound represented by the formula (7-2) shown below and a compound represented by the formula (7-3) shown below

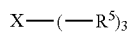
(7-1)

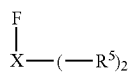
(7-2)

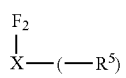
(7-3)

in the formula (7-1), (7-2) or (7-3), respectively, X represents a boron atom or an aluminum atom; F is a fluorine atom; and $R^5$ represents a substituted or unsubstituted phenyl group represented by the formula (8) shown below or a tertiary alkyl group represented by the formula (9) shown below, and each be the same or different,

(8)

in the formula (8), Y represents an alkyl group having 1 to 4 carbon atoms, a halogen atom, a nitro group or a cyano group; and k represents the number of 0 to 5 and, when k is 2 to 5 a plurality of Ys being respectively the same or different,

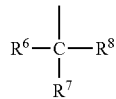
(9)

in the formula (9), $R^6$, $R^7$ or $R^8$ each independently represents an alkyl group having 1 to 4 carbon atom.

2. The polyoxyalkylene polyol or monool according to claim 1, wherein r is 0 in the formula (2).

3. The polyoxyalkylene polyol or monool according to claim 1, wherein the total content of zinc, iron, cobalt, chromium and manganese is 2 ppm or less in the polyoxyalkylene polyol or monool (S).

4. The polyoxyalkylene polyol or monool according to claim 1, wherein the hydroxyl value x is from 10 to 115 mgKOH/g.

5. The polyoxyalkylene polyol or monool according to claim 1, wherein 60% or more of the hydroxyl group-containing groups located at the terminal are primary hydroxyl group-containing groups represented by the formula (1).

6. A method for producing a polyoxyalkylene polyol or monool, comprising:
carrying out addition polymerization of an active hydrogen compound (H) with an alkylene oxide in the presence of a catalyst (C) in a reaction vessel (1) while removing a low boiling point compound (t) as a by-product having a boiling point of 150° C. or lower under a pressure of 0.1 MPa, continuously or intermittently, out of the system,
wherein the catalyst (C) is represented by one of formulae (7-1) to (7-3) below

(7-1)

(7-2)

(7-3)

in the formula (7-1), (7-2) or (7-3), respectively, X represents a boron atom or an aluminum atom; F is a fluorine atom; and $R^5$ represents a substituted or unsubstituted phenyl group represented by the formula (8) shown below or a tertiary alkyl group represented by the formula (9) shown below, and each be the same or different,

(8)

in the formula (8), Y represents an alkyl group having 1 to 4 carbon atoms, a halogen atom, a nitro group or a cyano group; and k represents the number of 0 to 5 and, when k is 2 to 5, a plurality of Ys being respectively the same or different,

(9)

in the formula (9), $R^6$, $R^7$ or $R^8$ each independently represents an alkyl group having 1 to 4 carbon atom.

7. The method according to claim 6, wherein the low boiling point compound (t) is selected from the group consisting of formaldehyde, acetaldehyde, propionaldehyde, allyl alcohol, and a compound formed by adding less than 2 mol of alkylene oxide to allyl alcohol.

8. A foamed or non-foamed polyurethane resin obtained by reacting a polyol component with an organic polyisocyanate component (V), wherein the polyoxyalkylene polyol or monool according to claim 1 is used as at least a part of the polyol component.

* * * * *